US012608267B2

(12) United States Patent
Spirkl et al.

(10) Patent No.: US 12,608,267 B2
(45) Date of Patent: Apr. 21, 2026

(54) LEARNED TEMPERATURE COMPENSATION

(71) Applicant: Micron Technology, Inc., Boise, ID (US)

(72) Inventors: Wolfgang Anton Spirkl, Germering (DE); Casto Salobrena Garcia, Munich (DE); Michael Dieter Richter, Ottobrunn (DE); Thomas Hein, Munich (DE); Peter Mayer, Neubiberg (DE)

(73) Assignee: Micron Technology, Inc., Boise, ID (US)

( * ) Notice: Subject to any disclaimer, the term of this patent is extended or adjusted under 35 U.S.C. 154(b) by 144 days.

(21) Appl. No.: 18/737,831

(22) Filed: Jun. 7, 2024

(65) Prior Publication Data

US 2025/0013525 A1     Jan. 9, 2025

Related U.S. Application Data

(60) Provisional application No. 63/525,499, filed on Jul. 7, 2023.

(51) Int. Cl.
*G06F 11/07*        (2006.01)
*G06F 11/30*        (2006.01)

(52) U.S. Cl.
CPC ........ *G06F 11/0793* (2013.01); *G06F 11/076* (2013.01); *G06F 11/3058* (2013.01)

(58) Field of Classification Search
CPC .............. G06F 11/0793; G06F 11/076; G06F 11/3058; G06F 3/0655; G06F 18/214

USPC .............................................. 365/211, 230.06
See application file for complete search history.

(56) References Cited

U.S. PATENT DOCUMENTS

| | | | | |
|---|---|---|---|---|
| 2003/0152118 A1* | 8/2003 | Chieng | ............... | H01S 5/06804 |
| | | | | 372/33 |
| 2016/0117105 A1* | 4/2016 | Thangaraj | ............. | G06F 3/0604 |
| | | | | 711/103 |
| 2017/0177241 A1* | 6/2017 | Erickson | ............... | G06F 3/0655 |
| 2020/0004458 A1* | 1/2020 | Cerafogli | ................ | G11C 7/04 |
| 2020/0258566 A1* | 8/2020 | Schaefer | .......... | G11C 11/40615 |
| 2021/0173583 A1* | 6/2021 | Kale | ...................... | G06F 3/0655 |
| 2021/0233579 A1* | 7/2021 | Aquil | ................. | G06F 13/4243 |
| 2022/0261363 A1* | 8/2022 | Confalonieri | ....... | G06F 13/1694 |
| 2022/0283968 A1* | 9/2022 | Kim | .................... | G06F 13/1689 |
| 2022/0405002 A1* | 12/2022 | Macerola | ................ | G11C 7/04 |
| 2023/0266909 A1* | 8/2023 | Kale | .................... | G06F 3/0604 |

(Continued)

*Primary Examiner* — Michael T Tran

(74) *Attorney, Agent, or Firm* — Holland & Hart LLP

(57)        ABSTRACT

Methods, systems, and devices for techniques for coupled host and memory dies are described. A first set of parameters associated with operating an interface between a host system and a memory system may be determined based on a first training operation, where an indication of the first set of parameters and a first temperature associated with the first training operation may be stored. A second set of parameters associated with operating the interface may be determined based on a second training operation, where an indication of the second set of parameters and a second temperature associated with the second training operation may be stored. At a third temperature, a third set of parameters may be configured for operation of the interface based on the stored sets of parameters, and communications over the interface may be performed in accordance with the third set of parameters.

25 Claims, 7 Drawing Sheets

(56)                    References Cited

U.S. PATENT DOCUMENTS

| | | | |
|---|---|---|---|
| 2023/0341915 A1* | 10/2023 | Brox | ........................ G06F 1/206 |
| 2023/0367379 A1* | 11/2023 | Vaysman | .............. G06F 1/3225 |
| 2023/0384940 A1* | 11/2023 | Chandrashekaraiah | ..................... G06F 3/0653 |

* cited by examiner

105 — Host System

Processor 125

Host System Controller 120

115

110 — Memory System

Memory System Controller 140

Memory Device 145

Local Controller 150

Memory Array 155

• • •

Memory Device 145

Local Controller 150

Memory Array 155

100

| Temperature | Storage Time | Parameter_1 | • • • | Parameter_N |
|---|---|---|---|---|
| 100 °F | 9/9/22 11:12:13 | 14 | | .3V, .6V |
| 120 °F | 8/9/22 12:11:15 | 16 | | .35V, .65V |
| ⋮ | ⋮ | | | |
| 200 °F | 9/9/22 9:10:13 | 20 | • • • | .4V, .7V |

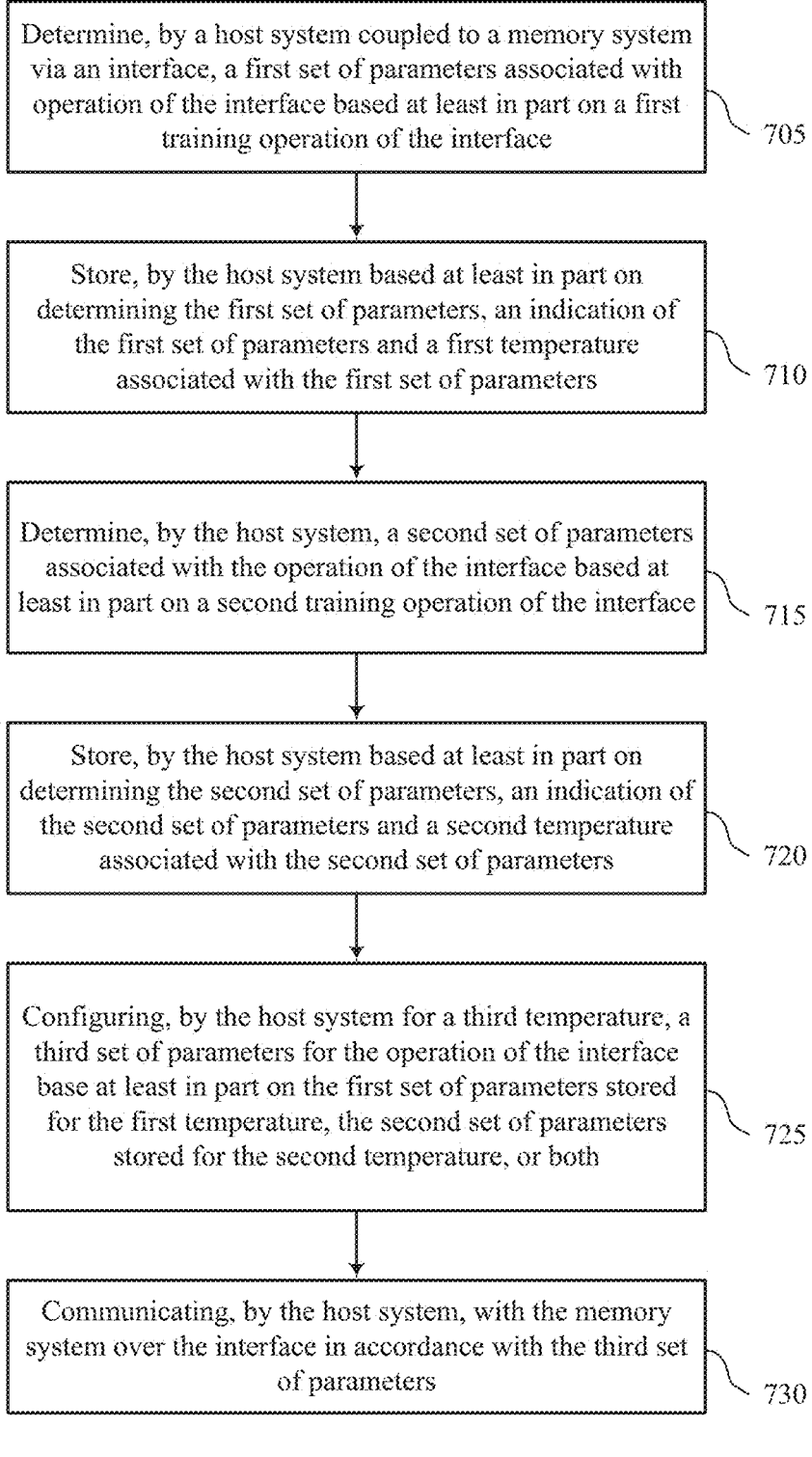

Determine, by a host system coupled to a memory system via an interface, a first set of parameters associated with operation of the interface based at least in part on a first training operation of the interface    705

Store, by the host system based at least in part on determining the first set of parameters, an indication of the first set of parameters and a first temperature associated with the first set of parameters    710

Determine, by the host system, a second set of parameters associated with the operation of the interface based at least in part on a second training operation of the interface    715

Store, by the host system based at least in part on determining the second set of parameters, an indication of the second set of parameters and a second temperature associated with the second set of parameters    720

Configuring, by the host system for a third temperature, a third set of parameters for the operation of the interface base at least in part on the first set of parameters stored for the first temperature, the second set of parameters stored for the second temperature, or both    725

Communicating, by the host system, with the memory system over the interface in accordance with the third set of parameters    730

LEARNED TEMPERATURE COMPENSATION

CROSS REFERENCE

The present application for patent claims priority to U.S. Patent Application No. 63/525,499 by Spirkl et al., entitled "LEARNED TEMPERATURE COMPENSATION," filed Jul. 7, 2023, which is assigned to the assignee hereof, and which is expressly incorporated by reference in its entirety herein.

TECHNICAL FIELD

The following relates to one or more systems for memory, including learned temperature compensation.

BACKGROUND

Memory devices are used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored by the memory cell. To store information, a memory device may write (e.g., program, set, assign) states to the memory cells. To access stored information, a memory device may read (e.g., sense, detect, retrieve, determine) states from the memory cells.

BRIEF DESCRIPTION OF THE DRAWINGS

FIG. 4 shows an example of a data structure that supports learned temperature compensation in accordance with examples as disclosed herein.

FIG. 7 shows a flowchart illustrating a method or methods that support learned temperature compensation in accordance with examples as disclosed herein.

DETAILED DESCRIPTION

To compensate for changes in the performance or characteristics of a system (that includes a host system, an interface, and a memory system coupled with the host system via the interface) due to temperature changes, the host system may perform calibration procedures to determine preferred parameters for operating the memory system at a current temperature of the system. But a performance of the system may be reduced while the calibration procedures are performed. Accordingly, performing a separate calibration procedure each time the preferred parameters for operating the system are desired to be determined (e.g., each time there is a change in temperature) may result in the performance of the system being systematically reduced across the life of the system. Thus, techniques and configurations that reduce the impact of temperature compensation procedures on the performance of the system may be desired.

Techniques for leveraging prior calibration procedures throughout the life of the system are described herein. These techniques may reduce an impact of temperature compensation on the performance of the system.

Figure 1:
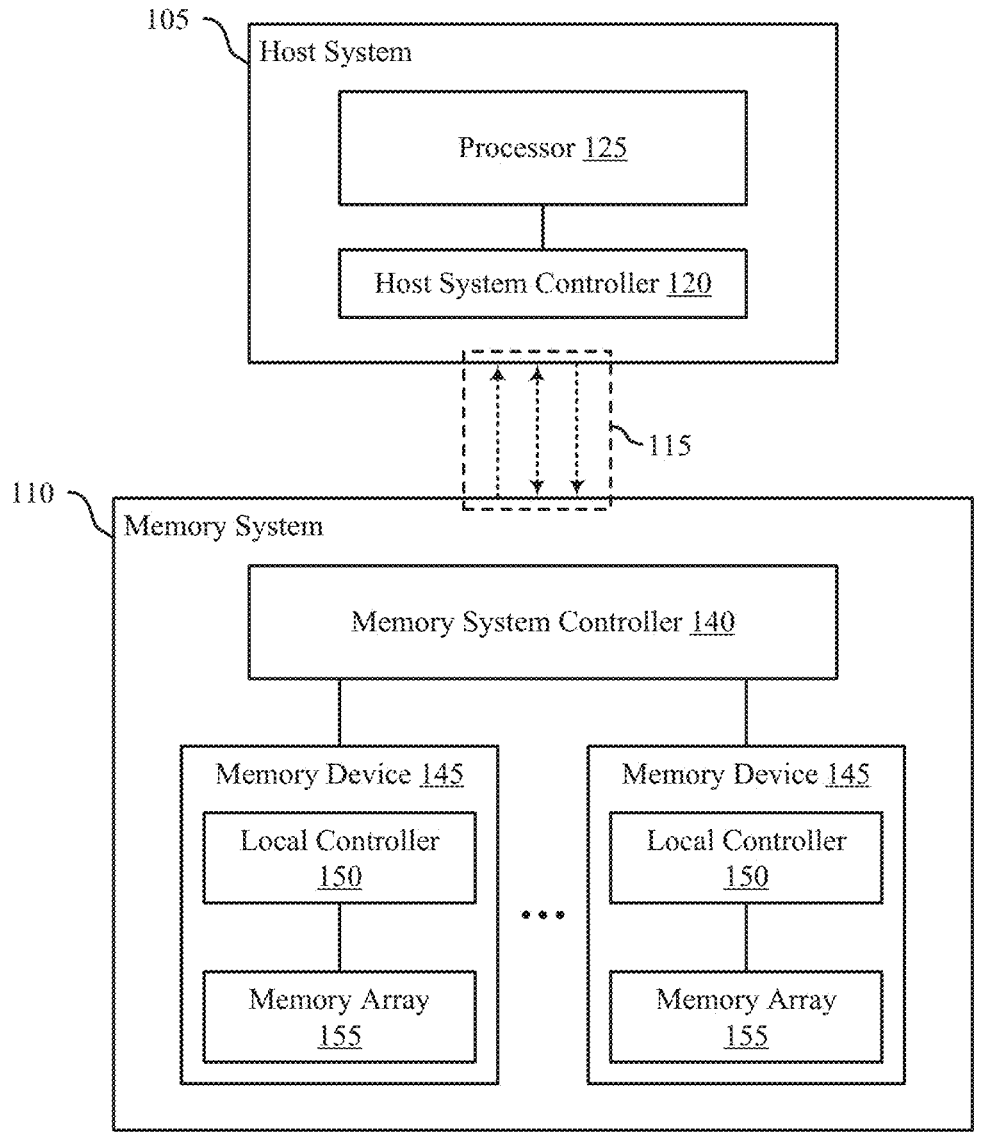
FIG. 1 shows an example of a system that supports learned temperature compensation in accordance with examples as disclosed herein.

FIG. 1 illustrates an example of a system 100 that supports learned temperature compensation in accordance with examples as disclosed herein. The system 100 may include portions of an electronic device, such as a computing device, a mobile computing device, a wireless communications device, a graphics processing device, a vehicle, a smartphone, a wearable device, an internet-connected device, a vehicle controller, a system on a chip (SoC), or other stationary or portable electronic system, among other examples. The system 100 includes a host system 105, a memory system 110, and one or more channels 115 coupling the host system 105 with the memory system 110 (e.g., to support a communicative coupling). The system 100 may include any quantity of one or more memory systems 110 coupled with the host system 105.

The host system 105 may include one or more components (e.g., circuitry, processing circuitry, a processing component) that use memory to execute processes, any one or more of which may be referred to as or be included in a processor 125. The processor 125 may include at least one of one or more processing elements that may be co-located or distributed, including a general-purpose processor, a digital signal processor (DSP), an application-specific integrated circuit (ASIC), a field-programmable gate array (FPGA) or other programmable logic device, a controller, discrete gate or transistor logic, one or more discrete hardware components, or a combination thereof. The processor 125 may be an example of a central processing unit (CPU), a graphics processing unit (GPU), a general-purpose GPU (GPGPU), or an SoC or a component thereof, among other examples.

The host system 105 may also include at least one of one or more components (e.g., circuitry, logic, instructions) that implement the functions of an external memory controller (e.g., a host system memory controller), which may be referred to as or be included in a host system controller 120. For example, a host system controller 120 may issue commands or other signaling for operating the memory system 110, such as write commands, read commands, configuration signaling or other operational signaling. In some examples, the host system controller 120, or associated functions described herein, may be implemented by or be part of the processor 125. For example, a host system controller 120 may be hardware, instructions (e.g., software, firmware), or some combination thereof implemented by the processor 125 or other component of the host system 105. In various examples, a host system 105 or a host system controller 120 may be referred to as a host.

The memory system 110 provides physical memory locations (e.g., addresses) that may be used or referenced by the system 100. The memory system 110 may include a memory system controller 140 and one or more memory devices 145 (e.g., memory packages, memory dies, memory chips) operable to store data. The memory system 110 may be configurable for operations with different types of host systems 105, and may respond to commands from the host system 105 (e.g., from a host system controller 120). For example, the memory system 110 (e.g., a memory system controller 140) may receive a write command indicating that the memory system 110 is to store data received from the host system 105, or receive a read command indicating that the memory system 110 is to provide data stored in a memory device 145 to the host system 105, or receive a refresh command indicating that the memory system 110 is to refresh data stored in a memory device 145, among other types of commands and operations.

A memory system controller 140 may include at least one of one or more components (e.g., circuitry, logic, instructions) operable to control operations of the memory system 110. A memory system controller 140 may include hardware or instructions that support the memory system 110 performing various operations, and may be operable to receive, transmit, or respond to commands, data, or control information related to operations of the memory system 110. A memory system controller 140 may be operable to communicate with one or more of a host system controller 120, one or more memory devices 145, or a processor 125. In some examples, a memory system controller 140 may control operations of the memory system 110 in cooperation with the host system controller 120, a local controller 150 of a memory device 145, or any combination thereof. Although the example of memory system controller 140 is illustrated as a separate component of the memory system 110, in some examples, aspects of the functionality of the memory system 110 may be implemented by a processor 125, a host system controller 120, at least one of one or more local controllers 150, or any combination thereof.

Each memory device 145 may include a local controller 150 and one or more memory arrays 155. A memory array 155 may be a collection of memory cells (e.g., a two-dimensional array, a three-dimensional array), with each memory cell being operable to store data (e.g., as one or more stored bits). Each memory array 155 may include memory cells of various architectures, such as random access memory (RAM) cells, dynamic RAM (DRAM) cells, synchronous dynamic RAM (SDRAM) cells, static RAM (SRAM) cells, ferroelectric RAM (FeRAM) cells, magnetic RAM (MRAM) cells, resistive RAM (RRAM) cells, phase change memory (PCM) cells, chalcogenide memory cells, not-or (NOR) memory cells, and not-and (NAND) memory cells, or any combination thereof.

A local controller 150 may include at least one of one or more components (e.g., circuitry, logic, instructions) operable to control operations of a memory device 145. In some examples, a local controller 150 may be operable to communicate (e.g., receive or transmit data or commands or both) with a memory system controller 140. In some examples, a memory system 110 may not include a memory system controller 140, and a local controller 150 or a host system controller 120 may perform functions of a memory system controller 140 described herein. In some examples, a local controller 150, or a memory system controller 140, or both may include decoding components operable for accessing addresses of a memory array 155, sense components for sensing states of memory cells of a memory array 155, write components for writing states to memory cells of a memory array 155, or various other components operable for supporting described operations of a memory system 110.

A host system 105 (e.g., a host system controller 120) and a memory system 110 (e.g., a memory system controller 140) may communicate information (e.g., data, commands, control information, configuration information) using one or more channels 115. Each channel 115 may be an example of a transmission medium that carries information, and each channel 115 may include one or more signal paths (e.g., a transmission medium, an electrical conductor, a conductive path) between terminals (e.g., nodes, pins, contacts) associated with the components of the system 100. A terminal may be an example of a conductive input or output point of a device of the system 100, and a terminal may be operable as part of a channel 115. To support communications over channels 115, a host system 105 (e.g., a host system controller 120) and a memory system 110 (e.g., a memory system controller 140) may include receivers (e.g., latches) for receiving signals, transmitters (e.g., drivers) for transmitting signals, decoders for decoding or demodulating received signals, or encoders for encoding or modulating signals to be transmitted, among other components that support signaling over channels 115, which may be included in a respective interface portion of the respective system.

A channel 115 be dedicated to communicating one or more types of information, and channels 115 may include unidirectional channels, bidirectional channels, or both. For example, the channels 115 may include one or more command and address channels, one or more clock signal channels, one or more data channels, among other channels or combinations thereof. In some example, a channel 115 may be configured to provide power from one system to another (e.g., from the host system 105 to the memory system 110, in accordance with a regulated voltage). In some examples, at least a subset of channels 115 may be configured in accordance with a protocol (e.g., a logical protocol, a communications protocol, an operational protocol, an industry standard), which may support configured operations of and interactions between a host system 105 and a memory system 110.

A command/address channel (e.g., a CA channel) may be operable to communicate commands between the host system 105 and the memory system 110, including control information associated with the commands (e.g., address information). Commands carried by a command/address channel may include a write command with an address for data to be written to the memory system 110 or a read command with an address of data to be read from the memory system 110.

A clock signal channel may be operable to communicate one or more clock signals between the host system 105 and the memory system 110. Clock signals may oscillate between a high state and a low state, and may support coordination (e.g., in time) between operations of the host system 105 and the memory system 110. In some examples, a clock signal may provide a timing reference for operations of the memory system 110. A clock signal may be referred to as a control clock signal, a command clock signal, or a system clock signal. A system clock signal may be generated by a system clock, which may include one or more hardware components (e.g., oscillators, crystals, logic gates, transistors).

A data channel (e.g., a DQ channel) may be operable to communicate (e.g., bidirectionally) information (e.g., data, control information) between the host system 105 and the memory system 110. For example, a data channel may communicate information from the host system 105 to be written to the memory system 110, or information read from the memory system 110 to the host system 105. In some examples, channels 115 may include one or more error detection code (EDC) channels. An EDC channel may be operable to communicate error detection signals, such as checksums or parity bits, which may accompany information conveyed over a data channel.

Signaling may be communicated over the channels 115 using single data rate (SDR) signaling or double data rate (DDR) signaling, among other rates (e.g., relative to a clock signal). In SDR signaling, one modulation symbol (e.g., signal level) of a signal may be registered for each clock cycle (e.g., on a rising edge or a falling edge of a clock signal). In DDR signaling, two modulation symbols of a signal may be registered for each clock cycle (e.g., on both a rising edge and a falling edge of a clock signal).

Signals communicated over the channels 115 may be modulated using various modulation schemes or combinations thereof. A symbol of a binary-symbol (e.g., binary-level) modulation scheme may be operable to represent one bit of data (e.g., a symbol may represent a logic 1 or a logic 0), and may be an example of an M-ary modulation scheme where M is equal to two. Examples of binary-symbol modulation schemes include non-return-to-zero (NRZ), unipolar encoding, bipolar encoding, Manchester encoding, pulse amplitude modulation (PAM) having two different symbols (e.g., PAM2), and others. A symbol of a multi-bit modulation scheme may be operable to represent more than one bit of data (e.g., a symbol may represent a logic 00, a logic 01, a logic 10, or a logic 11), and may be an example of an M-ary modulation scheme where M is greater than or equal to three. For example, a multi-bit signal may be modulated using a modulation scheme that includes at least three levels to encode more than one bit of information. Multi-bit modulation schemes and symbols may be referred to as non-binary, multi-bit, or higher-order modulation schemes and symbols. Examples of multi-symbol modulation schemes include PAM3, PAM4, PAM8, and so on, quadrature amplitude modulation (QAM), quadrature phase shift keying (QPSK), and others.

A system 100 may operate across a range of temperatures. In some examples, the temperatures may be measured at a component of the system 100, measured from an ambient environment that the system 100 is within, or the like. A performance of the system 100 may change at different temperatures (e.g., may be harmed or improved relative to a baseline performance of the system 100). In some examples, characteristics of the system 100 may change at different temperatures (which may affect the performance of the system 100). For example, clock signals, reference voltages, or both, at the host system 105 may be modified at different temperatures (e.g., a frequency of the clock signals, a jitter of the clock signals, a processing capability of the host system 105, reference voltages used by the host system 105 to transmit or decode data, and the like, may change). Similarly, clock signals, reference voltages, or both, at the memory system 110 may be dependent on temperature. Also, other internal timing signals within the memory system 110 may be dependent on temperature. In some examples, timings for certain operations performed within the system 100 (e.g., timings for executing a read or write command) may become shorter or longer as a result of modified internal and/or interface timings. In some examples, the modified characteristics of the system 100 may cause data to be communicated over an interface between the host system 105 and the memory system 110 with reduced performance and/or increased errors.

In some examples, modified internal and/or interface timings caused by temperature changes may cause the host system 105, the memory system 110, or both, to communicate data over an interface with timings that are offset from clocks used to read data from or write data to the memory system 110 (which may result in data communication errors). Additionally, or alternatively, voltages used to support operations performed within the system 100 may become higher or lower. In some examples, the modified voltages may cause the host system 105, the memory system 110, or both, to incorrectly encode or decode data over an interface (e.g., if drift in a reference voltage causes a voltage of a sensed memory cell or a voltage of a received data signal to be incorrectly encoded or decoded).

To compensate for changes in the performance or characteristics of a system 100 that are caused by temperature changes, the host system 105 may perform (e.g., periodically) a calibration procedure for determining the current characteristics of and/or preferred parameters for operating the memory system 110 at a current temperature of the system 100. After performing the calibration procedure, the host system 105 may identify preferred parameters for operating the memory system 110 that result in an expected or improved performance of the system 100. For example, the memory system 110 may determine a preferred timing for command/address signaling, a preferred timing for reading data from the memory system, a preferred timing for writing data to the memory system, a preferred offset between a data signal and a data clock signal, a preferred set of reference voltages associated with data signaling levels, or any combination thereof.

But a performance of the system 100 may be reduced while the calibration procedure is performed—e.g., fewer memory commands may be processed during the calibration procedure, or the processing of memory commands may be paused entirely during the calibration procedure. Accordingly, performing a separate calibration procedure each time the current characteristics of and/or preferred parameters for operating the system 100 are desired to be determined (e.g., each time there is a change in temperature) may result in the performance of the system being systematically reduced across the life of the system 100. Thus, techniques and configurations that reduce the impact of temperature compensation procedures on the performance of the system 100 may be desired.

Techniques for leveraging prior calibration procedures throughout the life of the system 100 are described herein. These techniques may reduce an impact of temperature compensation on the performance of the system 100.

As described herein, the host system 105 may be coupled to the memory system 110 via an interface that includes the one or more channels 115. In some examples, the system 100 may experience a first temperature—e.g., a temperature of the host system 105 may be the first temperature, a temperature of the memory system 110 may be the first temperature, a combined temperature of the host system 105 and the memory system 110 may be the first temperature. While experiencing the first temperature, the host system 105 may perform a first training operation. In some examples, the host system 105 performs the first training operation based on determining that the first temperature (or a temperature close enough to the first temperature) has not yet been experienced by the system 100—e.g., based on determining that a difference between the first temperature and any previously recorded temperatures is greater than a threshold. In such cases, the first temperature may be referred to as a new temperature. In some examples, the host system 105 performs the first training operation based on determining that the first temperature (or a temperature within a threshold of the first temperature) has not been experienced by the system 100 within a threshold duration. In some examples, the host system 105 performs the first training operation based on determining that a threshold quantity of errors within a duration has occurred while the system 100 experiences the first temperature.

Based on performing the first training operation, the host system 105 may determine a first set of parameters (e.g., memory timings, such as a first timing for command/address signaling, a first timing for reading data from the memory system, a first timing for writing data to the memory system, a first offset between a data signal and a data clock signal; and voltages, such as a first set of reference voltages associated with data transmission levels, a first set of reference voltages associated with data reception levels, etc.) for operating the interface. Based on determining the first set of parameters, the host system 105 may store an indication of the first set of parameters along with the first temperature associated with the first set of parameters. In some examples, the first set of parameters and the first temperature may be stored in a first row of a table implemented at the host system 105.

In some examples, (e.g., after experiencing the first temperature) the system 100 may experience a second temperature—e.g., a temperature of the host system 105 may be the second temperature, a temperature of the memory system 110 may be second first temperature, a combined temperature of the host system 105 and the memory system 110 may be the second temperature. In some examples, the second temperature may be above the first temperature. In other examples, the second temperature may be below the first temperature. While experiencing the second temperature, the host system 105 may perform a second training operation—e.g., based on determining that a difference between the second temperature and any previously recorded temperatures is greater than a threshold. Based on performing the second training operation, the host system 105 may determine a second set of parameters for operating the interface. Based on determining the second set of parameters, the host system 105 may store an indication of the second set of parameters along with the second temperature associated with the first set of parameters. In some examples, the second set of parameters and the second temperature may be stored in a second row of the table.

In some examples, (e.g., after experiencing the first temperature and the second temperature), the system 100 may experience a third temperature. In some examples, a difference between the third temperature and a previously recorded temperature may be within the threshold. In some examples, the third temperature may be between the first temperature. In other examples, the third temperature may be above or below the first temperature and the second temperature. Based on experiencing the third temperature, the host system 105 may configure a third set of parameters for operating the interface, where the third set of parameters may be based on the first set of parameters stored for the first temperature and the second set of parameters stored for the second temperature. In some examples, the third set of parameters is selected based on an interpolation of the first set of parameters and the second set of parameters. In some examples, the third set of parameters is selected based on selecting a point on a line obtained by curve fitting multiple stored set of parameters (including the first set of parameters and the second set of parameters) across multiple temperatures. Based on configuring the third set of parameters, the host system 105 may communicate over the interface with the memory system 110 in accordance with the third set of parameters—e.g., using memory timings and reference voltages determined for the third temperature.

In some examples, one or more sets of parameters for multiple temperatures may be stored prior to storing the first set of parameters and the second set of parameters for the first temperature and the second temperature. In some examples, the first set of parameters and the second set of parameters are the initial parameters stored by the system 100.

By performing calibration procedures used for temperature compensation when a new temperature is experienced, the system 100 may determine parameters for operating the system 100 at new temperatures the first time they occur. Moreover, by storing the determined parameters, the system 100 may leverage the previously determined parameters when a stored temperature (or a temperature within a threshold difference of the stored temperature) reoccurs, reducing a quantity and frequency with which calibration procedures would otherwise be performed. Moreover, by storing and leveraging parameters determined for new temperatures as they occur, the system 100 may frontload the performance of the calibration procedures used to determine the parameters to a beginning of a life of the system 100 (when a majority of the new temperatures are experience), which may reduce the lingering effects associated with calibration procedures that do not store previously determined parameters throughout the life of the system 100.

In addition to applicability in systems as described herein, techniques for learned temperature compensation may be generally implemented to improve the performance (including gaming) of various electronic devices and systems. Some electronic device applications, including gaming and other high-performance applications, may be associated with relatively high processing requirements while also benefitting from relatively quick response times to improve user experience. As such, increasing processing speed, decreasing response times, or otherwise improving the performance of electronic devices may be desirable. Implementing the techniques described herein may improve the performance of electronic devices by improving a performance of the electronic devices across a wide range of temperatures while reducing the impact of the procedures used to identify the preferred operating parameters for improving the performance of the electronic device for different temperatures, which may decrease latency times, decrease data errors, or otherwise improve user experience, among other benefits.

Figure 2:
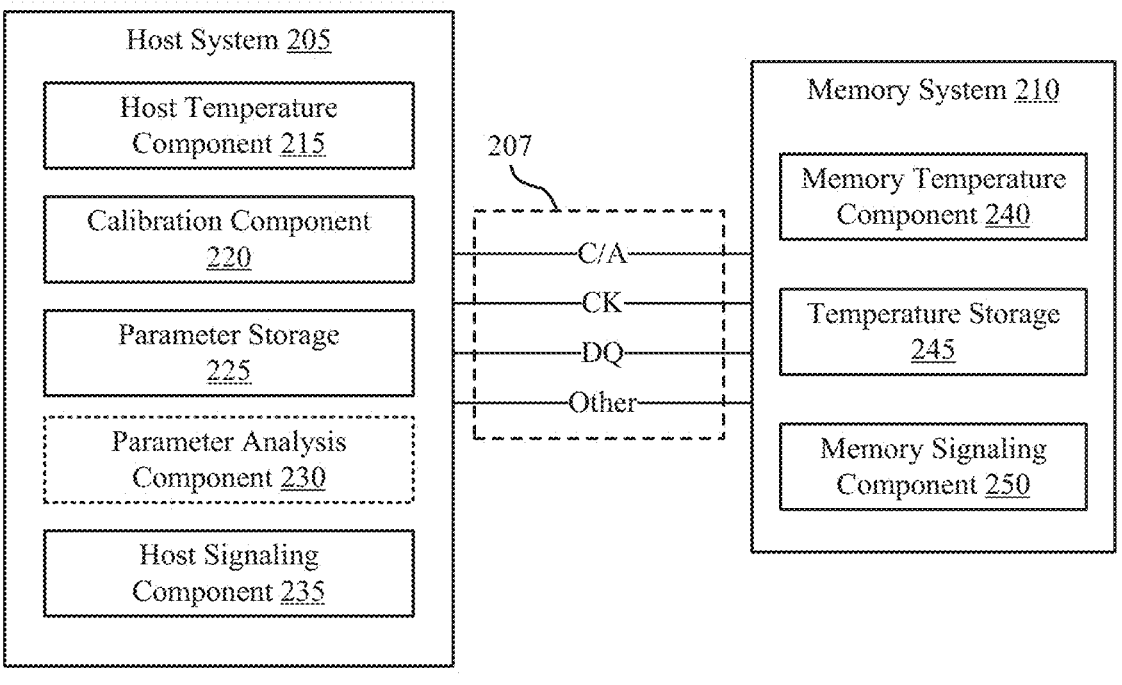
FIG. 2 shows an example of a subsystem that supports learned temperature compensation in accordance with examples as disclosed herein.

FIG. 2 shows an example of subsystem that supports learned temperature compensation in accordance with examples as disclosed herein.

The subsystem 200 may include the host system 205 (which may be an example of a host system described herein, including host system 105 of FIG. 1) and the memory system 210 (which may be an example of a memory system described herein, including memory system 110 of FIG. 1). The host system 205 and the memory system 210 may communicate with one another over the interface 207, which may be an example of, or include, channels described herein (e.g., the one or more channels 115 of FIG. 1).

The host system 205 may include the host temperature component 215, the calibration component 220, the parameter storage 225, the parameter analysis component 230, and the host signaling component 235.

The host temperature component 215 may be configured to measure a current temperature of the host system 205—e.g. a temperature near a processing unit of the host system 205.

The calibration component 220 may be configured to determine a preferred set of parameters for communicating data over the interface 207. In some examples, the calibration component 220 may perform a set of operations to determine preferred parameters for communicating data over the interface 207—e.g., a set of parameters that achieves a highest data rate within a threshold error rate. Additionally, or alternatively, the calibration component 220 may perform a set of operations to determine current characteristics (e.g., a drift between a data signal and a data clock, a timing between sending a read command and receiving data, a timing between sending a write command and writing data, an error rate for data communicated over the interface 207, etc.) for communicating over the interface 207. In some examples, the calibration component 220 may determine preferred parameters for communicating over the interface 207 based on the determined characteristics.

The calibration component 220 is configured to perform a calibration procedure in accordance with a temperature determined for the subsystem 200 (e.g., a temperature being measured by the host temperature component 215, a temperature being measured by the memory temperature component 240, a combined temperature of the temperature being measured by the host temperature component 215 and the temperature being measured by the memory temperature component 240). In some examples, the calibration component 220 determines the temperature for the subsystem 200 by reading a current temperature of the host system 205 form the host temperature component 215. In some examples, the calibration component 220 determines the temperature for the subsystem 200 by reading a last temperature of the memory system 210 from the temperature storage 245. In some examples, the calibration component 220 determines the temperature for the subsystem 200 by averaging a current temperature of the host system 205 read from the host temperature component 215 and a last temperature of the memory system 210 read from the temperature storage 245.

In some examples, the calibration component 220 may be configured to perform the calibration procedure in accordance with a set of temperatures for which parameter sets are currently stored in the parameter storage 225. For example, the calibration component 220 may be configured to perform a calibration procedure if a difference between the determined temperature and the closest temperatures stored in the parameter storage 225 exceeds a threshold—e.g., if the determined temperature is a new temperature experienced by the subsystem 200.

Additionally, or alternatively, the calibration component 220 may be configured to perform a calibration procedure in accordance with a time at which a set of parameters was stored for the temperature (or a temperature within a threshold of the determined temperature). For example, the calibration component 220 may be configured to perform the calibration procedure (despite a set of parameters being stored in the parameter storage 225 for a temperature within a threshold of the determined temperature) based on determining that the set of parameters have been stored in the parameter storage 225 for a threshold duration—e.g. even if the determined temperature is not a new temperature determined by the subsystem 200.

Additionally, or alternatively, the calibration component 220 may be configured to perform a calibration procedure in accordance with error statistics determined for communications over the interface 207 while the subsystem 200 is at the temperature. For example, the calibration component 220 may be configured to perform the calibration procedure (despite a set of parameters being stored in the parameter storage 225 for a temperature within a threshold of the determined temperature and/or despite the set of parameters being stored within a threshold duration) based on determining that an error rate for communicating over the interface 207 using the set of parameters satisfies an error rate threshold—e.g. even if the determined temperature is not a new temperature determined by the subsystem 200, —e.g. even if the determined temperature is not a new temperature determined by the subsystem 200, even if a set of parameters for the determined temperature was recently stored.

The calibration component 220 may be configured to perform calibration procedures at different temperature threshold granularities—e.g., based on an implementation of the subsystem 200, or applications running on the system. For example, the calibration component 220 may trigger calibration procedures in accordance with decreased temperature difference thresholds for mission critical implementations/applications (e.g., an automotive implementation, an autonomous driving applications). Or the calibration component 220 may trigger calibration procedures in accordance with increased temperature difference thresholds for non-mission critical application (e.g., a mobile device implementation, a web-browsing application).

In some examples, the calibration component 220 may be configured to accelerate the capture of sets of parameters for different temperatures. For example, the calibration component 220 may be configured to cause (e.g., at a beginning of the life of the subsystem 200) the host system 205 and/or the memory system 210 to perform one or more sequences of operations intended to cause the subsystem 200 to artificially (e.g., not in the course of standard operation) experience increased temperatures. For example, the calibration component 220 may send a sequence of commands to the memory system 210 and/or may cause the host system 205 to process data received as a result of the commands in accordance with a sequence of instructions.

The parameter storage 225 may be configured to store sets of parameters for different temperatures experienced by the subsystem 200. The parameter storage 225 may support the operation of a database (e.g., a relational database) that includes one or more tables. The one or more tables may each include one or more rows and columns. In some examples, the parameter storage 225 may be configured to store the sets of parameters determined for the different temperatures experienced by the subsystem 200 in a table. For example, the parameter storage 225 may be configured to store a determined temperature in a first row and column of the table and indications of a corresponding parameter set in the first row and one or more subsequent columns of the table. The parameter storage 225 may be further configured to store a time at which a determined temperature and corresponding parameter set are stored in the table.

In some examples, the parameter storage 225 may implement a first table that stores determined temperature/parameter sets with a first granularity, a second table that stores determined temperature/parameter sets with a second (e.g., greater) granularity, and so on. In some examples, increasing a temperature granularity (to be rougher) of a table may increase a speed at which parameter sets may be identified and configured by the host signaling component 235. In some examples, a table using a higher temperature granularity may be accessed (e.g., by the host signaling component 235) at an increased speed, which may enable quicker configurations of different parameters for different temperatures (e.g., by the host signaling component 235).

Additionally, or alternatively, the parameter storage 225 may implement a first table that stores a determined temperature and a first subset of parameters, a second table that stores a determined temperature and a second subset of parameters (e.g., that includes additional parameters relative to the first subset of parameters), and so on. In some examples, a table using parameter sets with fewer parameters may be accessed (e.g., by the host signaling component 235) at an increased speed, which may enable quicker configurations of different parameters for different temperatures (e.g., by the host signaling component 235).

In some examples, the parameter storage 225 may be configured with varying degrees of granularity. For example, the parameter storage 225 may use a first (fine) granularity for a first temperature range (within which variations that exceed a threshold occur for parameter characteristics) and a second (coarse) granularity for a second temperature range (within which variations that are below a threshold occur for parameter characteristics). In some examples, the parameter analysis component 230 may detect one or more temperature ranges within parameter storage 225 that are associated with parameter variations that exceed a threshold (e.g., based on currently stored temperature/parameter sets), and may configure the parameter storage 225 to store the parameter sets for temperatures within the one or more detected temperature ranges in accordance with a finer temperature granularity (relative to temperature ranges associated with parameter variations that are below the threshold).

The parameter analysis component 230 may be configured to analyze the parameter data stored in the parameter storage 225. In some examples, the parameter analysis component 230 may be configured to interpolate values of the parameters across temperature. The interpolation may be used to identify values for parameters for temperatures experienced by the subsystem 200 that are different than temperatures stored in the parameter storage. In some examples, the parameter analysis component 230 may be configured to perform a curve fitting operation for one or more of the stored parameters across temperature—e.g., the parameter analysis component 230 may be used to generate a line of best fit. In some examples, the curve fitting operation may be based on predetermined factors, such as a slope or a curve characteristic of temperature variation for one or more parameters—e.g., determined during prior observation or modeling.

The host signaling component 235 may be configured to communicate information (e.g., commands, addresses, data, error management codes, etc.) over the interface 207. The host signaling component 235 may be configured to communicate information over the interface using one or more signaling techniques—e.g., binary signaling schemes, such as non-return-to-zero, PAM2, etc.; multi-level signaling schemes, such as PMA3, PAM4, QAM, etc. For binary signaling schemes, the host signaling component 235 may generate a single reference voltage for distinguishing between two voltages used to represent two logic values. For multi-level signaling schemes, the host signaling component 235 may generate multiple reference voltages for transmission of the levels, or multiple reference voltages for distinguishing between three or more voltages used to represent three or more logic values during reception. In some examples, the host signaling component 235 may generate a first set of reference voltages for signal transmission and a second set of reference voltages for signal reception.

The host signaling component 235 may be further configured to communicate the information over the interface 207 in accordance with a current temperature of the subsystem 200 (e.g., a temperature being measured by the host temperature component 215, a temperature being measured by the memory temperature component 240, a combined temperature of the temperature being measured by the host temperature component 215 and the temperature being measured by the memory temperature component 240) and the sets of parameters stored in the parameter storage 225. For example, based on determining a current temperature of the subsystem 200, the host signaling component 235 may query a table in the parameter storage that stores mappings between measured temperatures and determined sets of parameters for the set of parameters corresponding to a temperature that is within a threshold of the current temperature of the subsystem 200. In response, the parameter storage 225 may provide the corresponding set of parameters to the host signaling component 235, which may perform subsequent communications over the interface 207 in accordance with the corresponding set of parameters. In some examples, the host signaling component 235 may be configured to query the parameter storage 225 based on detecting that an error rate for communicating over the interface 207 has increased by a threshold amount, that a temperature of the subsystem 200 has changed by a threshold amount, or a combination thereof.

In some examples, the host signaling component 235 may query a table in the parameter storage that stores mappings between measured temperatures and determined sets of parameters for multiple set of parameters that correspond to multiple temperatures that are close to the current temperature of the subsystem 200. In response, the parameter storage 225 may provide the corresponding sets of parameters to the host signaling component 235, which may interpolate the sets of parameters to obtain a calculated set of parameters. In some examples, the host signaling component 235 may be configured to query the parameter storage 225 based on detecting that an error rate for communicating over the interface 207 has increased by a threshold amount, that a temperature of the subsystem 200 has changed by a threshold amount, or a combination thereof.

Additionally, or alternatively, the host signaling component 235 may reference an interpolation of the stored parameters that is performed by the parameter analysis component 230 to determine a set of parameters to be used for the current temperature of the subsystem 200.

The host signaling component 235 may perform subsequent communications over the interface 207 in accordance with the set of parameters determined for the temperature of the subsystem 200. In some examples, communicating in accordance with the set of parameters includes modifying parameters (e.g., reference voltages, timing parameters) of the host system 205 for communicating over the interface 207. For example, the modified parameters may be associated with voltage levels for multi-level signaling, data and address timing offsets for transmission (e.g., relative to a clock), or data and address setup and/or hold timing for reception (e.g., relative to a clock) In some examples, communicating in accordance with the set of parameters includes modifying parameters of the memory system 210 (e.g., a memory timing, such as a column address strobe (CAS) latency, a row address to column address delay ($T_{RCD}$), a row precharge time ($T_{RP}$), a row active time ($T_{RAS}$)), or a combination thereof. In some examples, a timing for reading data from the memory system 210 may be based on the CAS latency, which may indicate a duration between a time at which a command is sent to the memory system 210 and a time at which data associated with the command is output by the memory system 210. The timing for reading the data may be further based on the $T_{RP}$ duration, which may indicate a time between receiving a command and activating a row, and the $T_{RCD}$ duration, which may indicate a time between activating a row and activating a column.

The interface 207 may be configured to convey data between the host system 205 and the memory system 210. In some examples, the interface includes a command/address (C/A) channel used to convey a command and associated address for executing the command, a clock (CK) channel for conveying a clock signal for reading data from or writing data to the memory system, a data (DQ) channel for conveying data to be written to or read from the memory system 210, among other channels. In some examples, data is conveyed over the interface in accordance with particular timings. For example, the interface may be configured to support the communication of data a certain quantity of clock cycles after a corresponding command is received, the interface may also support the communication of error management information for communicated data.

The memory system 210 may include the memory temperature component 240, the temperature storage 245, and the memory signaling component 250.

The memory temperature component 240 may be configured to measure a current temperature of the memory system 210—e.g. a temperature near one or more memory dies (e.g., from a sensor on or in thermal contact with the one or more memory dies) of the memory system 210.

The temperature storage 245 may be configured to store one or more temperatures of the memory system 210 measured by the memory temperature component 240. In some examples, the temperature storage 245 comprises a register, one or more memory cells, or a combination thereof.

The memory signaling component 250 may be configured to communicate information (e.g., commands, addresses, data, error management codes, etc.) over the interface 207. The memory signaling component 250 may be configured to communicate information over the interface using one or more signaling techniques—e.g., binary signaling schemes, such as non-return-to-zero, PAM2, etc.; multi-level signaling schemes, such as PAM3, PAM4, QAM, etc. For binary signaling schemes, the memory signaling component 250 may generate a single reference voltage for distinguishing between two voltages used to represent two logic values. For multi-level signaling schemes, the memory signaling component 250 may generate multiple reference voltages for distinguishing between three or more voltages used to represent three or more logic values. In some examples, the memory signaling component 250 may be configured to communicate over the interface 207 in accordance with one or more parameters configured by the host system 205—e.g., in accordance with a current temperature of the subsystem 200.

Figure 3:
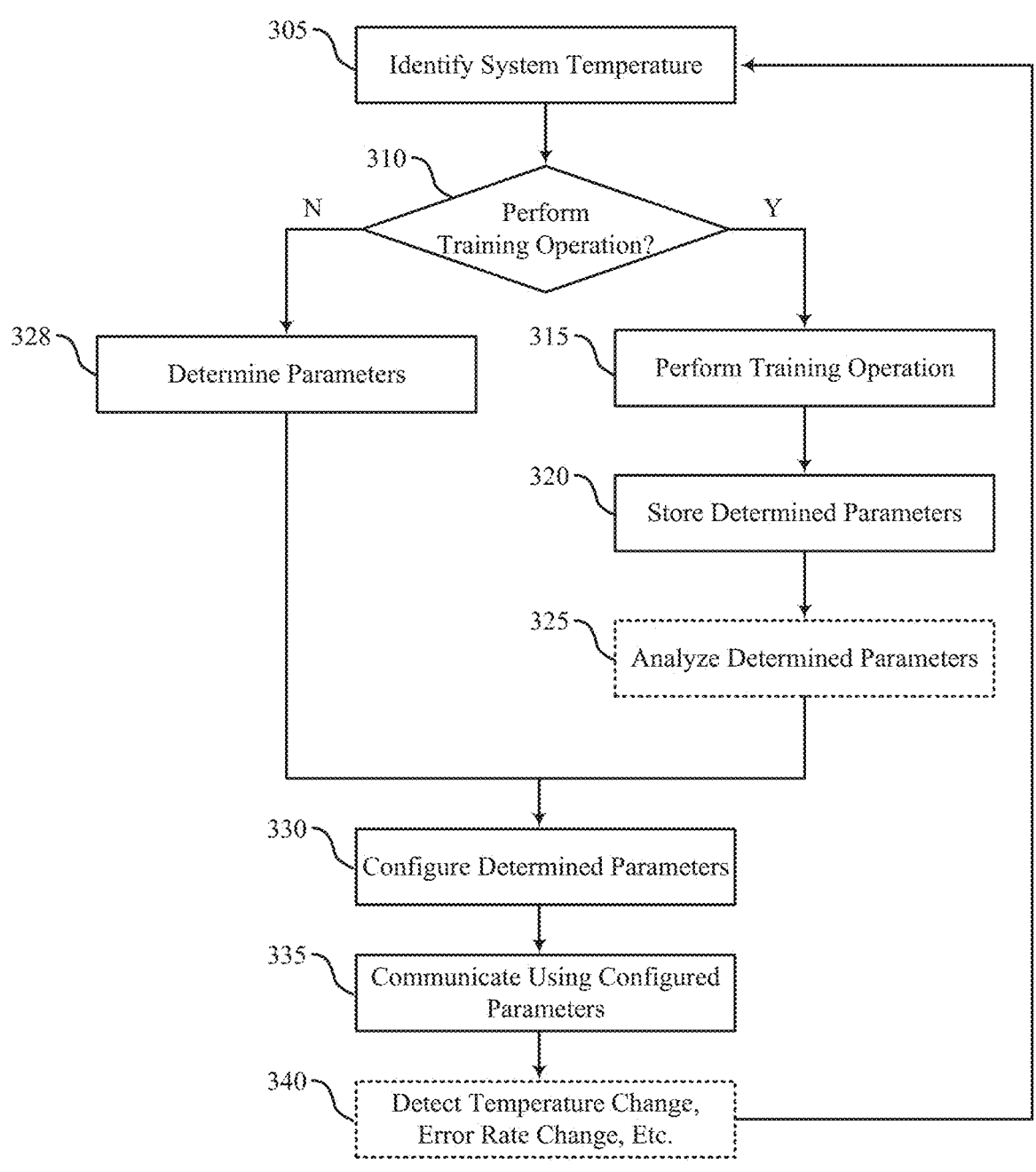
FIG. 3 shows an example of a flowchart that supports learned temperature compensation in accordance with examples as disclosed herein.

FIG. 3 shows an example of a set of operations that supports learned temperature compensation in accordance with examples as disclosed herein.

The flowchart 300 may be performed by a host system described herein (e.g., the host system 205 of FIG. 2). In some examples, the flowchart 300 illustrates an example set of operations performed to support learned temperature compensation. For example, the flowchart 300 may include operations for storing parameters determined for different system temperatures and leveraging stored parameters during operation.

At 305, a temperature of a system that includes the host system and a memory system (e.g., the memory system 210 of FIG. 2) coupled with the host system via an interface (e.g., the interface 207 of FIG. 2) may be identified (e.g., by the host system). In some examples, the temperature of the system may be identified based on measuring a temperature at the host system. In some examples, the temperature of the system may be identified based on measuring a temperature at the memory system. In some examples, the temperature of the system may be identified based on measuring a temperature at the interface. In some examples, the temperature of the system may be identified based on combining at least two of a temperature measured at the host system, a temperature measured at the interface, or a temperature of the memory system. In some examples, the host system may obtain the temperature of the memory system by reading a register or memory location at the memory system. In some examples, the host system may obtain the temperature of the interface by reading a register associated with the interface (e.g., a temperature sensor located on a circuit board or other connector).

At 310, a determination of whether to perform a training operation (which may also be referred to as a calibration procedure) for determining a preferred set of parameters for operating the interface at the identified system temperature may be made (e.g., by a calibration component, such as the calibration component 220 of FIG. 2).

In some examples, the determination of whether to perform the training operation may be made based on comparing the identified system temperature with one or more system temperatures for which preferred parameters for operating the interface that are already stored (e.g., at a parameter storage, such as the parameter storage 225 of FIG. 2). For example, a determination to perform the training operation may be made if a difference between the identified system temperature and a nearest stored system temperature of the one or more stored system temperatures is greater than or equal to a threshold (e.g., greater than 10° F.). Otherwise, a determination to not perform the training operation may be made if the difference between the identified system temperature and the nearest stored system temperature of the one or more system temperatures is less than the threshold. In some examples, no parameters may be stored for any system temperature, in which case, a determination to perform the training operation may be made.

In some examples, the determination of whether to perform the training operation may be made based on how long a stored system temperature that is within a threshold of the identified system temperature has been stored. For example, after identifying a stored system temperature within a threshold of the identified system temperature, a determination of whether the parameters for the stored system temperature have been stored for a threshold duration (e.g., days, weeks, months, etc.) may be made. If the parameters for the stored system temperature have been stored for the threshold duration, a determination that the parameters have expired and to perform the training procedure may be made. Otherwise, a decision to not perform the training operation may be made if it is determined that the parameters for the stored system temperature have been stored for less than the threshold duration.

In some examples, the determination of whether to perform the training operation may be made based on error statistics associated with communicating over the interface at the identified system temperature. For example, after identifying a stored system temperature within a threshold of the identified system temperature and determining that parameters for the stored system temperature have been stored for less than a threshold duration, a determination to perform the training operation may yet be made if error statistics (e.g., an error rate) associated with communicating over the interface using the parameters satisfy a threshold (e.g., if the error rate exceeds an error rate threshold).

At 315, based on determining to perform the training operation, the training operation may be performed (e.g., by the calibration component). In some examples, the training operation may include communicating over the interface at the identified system temperature with one or more varied parameters (e.g., varied latencies, varied reference voltages, etc.) and identifying a preferred performance of the communications (e.g., a lowest latency data transfer that achieves less than a threshold error rate, a highest data rate transfer that achieves less than the threshold error rate, or a combination thereof).

At 320, the one or more parameters determined for the identified system temperature may be stored (e.g., in the parameter storage) along with an indication of the identified system temperature for which the one or more parameters were determined. In some examples, the identified system temperature and the corresponding one or more parameters may be stored in a table maintained by the parameter storage. In some examples, the identified system temperature may be stored in a first row and column of the table and one or more indications of the one or more system parameters may be stored in one or more subsequent columns of the first row of the table. In some examples, multiple indications may be stored in multiple columns of the first row, where the multiple indications may indicate respective values for multiple parameters. In other examples, a single indication may be stored in a single column of the first row, where the single indication may indicate values for multiple parameters (e.g., using a coded value, a bitmap, etc.). A table used to store mappings between identified system temperatures and corresponding sets of parameters is described in more detail herein, including with reference to FIG. 4.

In some examples, the one or more parameters may be stored in multiple tables along with the indication of the identified system temperature. For example, the one or more parameters and temperature indication may be stored in a first table that stores parameters with a higher temperature granularity and a second table that stores parameters with a lower temperature granularity, and so on. Additionally, or alternatively, the one or more parameters and temperature indication may be stored in a first table for a first parameter of the one or more parameters, a second table for a second parameter of the one, or more parameters, and so on. In some examples, the different tables may be used for different applications—e.g., finer granularity tables and tables for an increased quantity of parameters may be used for mission critical applications while coarse granularity tables and tables for a decreased quantity of parameters (e.g., one parameter) may be used for loss/latency-tolerant applications. In some examples, the determination of whether to perform the training operation is based on which of the different tables is activated and the different granularities of the different tables—e.g., the determination of whether to perform the training operation may be based on the activated table with the finest granularity.

At 325, multiple sets of parameters stored for multiple system temperatures (including the one or more parameters stored for identified system temperature) may be analyzed (e.g., by a parameter analysis component, such as the parameter analysis component 230 of FIG. 2). In some examples, the parameter analysis component may interpolate values of the stored sets of parameters to enable parameters to be determined for system temperatures that are not stored in the parameter storage. For example, for a parameter, the parameter analysis component may apply a curve fitting technique to the values stored for the parameter to obtain a fitted line that is plotted across temperature. In some examples, the parameter analysis component may obtain the fitted line by linearly connecting parameter values that are next to one another according to associated temperature. In some examples, the parameter analysis component may obtain the fitted line by drawing a line through all of the connecting parameter values (e.g., using a mean squared error approach, polynomial regression, or a spline function). In some examples, the curve fitting technique may be based on predetermined factors, such as a slope or a curve characteristic of temperature variation for one or more parameters—e.g., determined during prior observation or modeling. Other approaches for obtaining a curve that is fitted to the values stored for a parameter across temperature may be used. Using a curve fitted line to determine parameter values is described in more detail herein, including with reference to FIG. 5.

At 328, based on determining to not perform the training operation, one or more parameters may be determined (e.g., by a host signaling component, such as the host signaling component 235 of FIG. 2) for the identified system temperature. In some examples, the one or more parameters may be determined by querying the parameter storage. For example, based on the system temperature being identified, the host signaling component may use the identified system temperature to query the parameter storage. In response to the query, the parameter storage may respond with one or more values for one or more parameters stored for a system temperature that is within a threshold of the identified system temperature.

In other examples, the one or more parameters may be determined by referencing an analysis of the stored parameters performed by the parameter analysis component. For example, based on the system temperature being identified, the host signaling component may identify, on one or more curves generated by the parameter analysis component, values for one or more parameters corresponding to the identified system temperature, where the values for the one or more parameters corresponding to the identified system temperature may have been calculated by the parameter analysis component from the values stored for the one or more parameters in the parameter storage.

At 330, the one or more parameters determined for the identified system temperature may be configured (e.g., by the host signaling component) for communications over the interface. Configuring the parameters may include configuring (e.g., by the host signaling component) one or more parameters used by the host system (e.g., reference voltages for decoding signaling, reference voltages for encoding signaling) to communicate over the interface. Additionally, or alternatively, configuring the parameters may include configuring (e.g., by the host signaling component) one or more parameters (e.g., reference voltages for encoding signaling, reference voltages for decoding signaling, a CAS latency) used by the memory system to communicate over the interface. In some examples, multi-level signaling may be used, in which case, the host system and memory system may use multiple reference voltages for encoding and decoding signaling.

At 335, communications may be performed (e.g., by the host signaling component and a memory signaling component, such as the memory signaling component 250 of FIG. 2) over the interface in accordance with the one or more configured parameters.

At 340, a change in a temperature (of greater than a threshold amount) of the system may be detected (e.g., by the host signaling component). Additionally, or alternatively, a change in an error rate (of greater than a threshold amount) of communications over the interface may be detected (e.g., by the host signaling component). Based on detecting the change, a temperature of the system may again be identified, and the operations related to the training operation and determining parameter may be performed. In some examples, in addition or as an alternative to detecting a change in an error rate, the temperature of the system may again be identified based on a determination that a current error rate of communications over the interface is exceeding a threshold.

In some examples, the host system may be configured to accelerate the capture of different sets of parameters for different temperatures—e.g., by performing a set of operations and/or causing the memory system to perform a set of operations that increase the temperature of the system.

In some examples, the host system may provide parameters for the calibration procedure, which may affect a frequency with which the calibration procedure is performed (e.g., by changing a temperature threshold granularity), which parameters the calibration procedure determines, and the like. In some examples, the parameters are provided by the host system based on an implementation of the system, an application being run by the system, or the like. For example, the host system may cause the calibration procedure to be performed with a finer temperature threshold granularity and for additional parameters if the system is implemented in an automotive environment. Additionally, or alternatively, the host system may cause the calibration procedure to be performed with a finer temperature threshold granularity and for additional parameters for a system implemented in an automotive environment when the system is used for an autonomous driving application.

Aspects of the flowchart 300 may be implemented by a controller, among other components. Additionally, or alternatively, aspects of the flowchart 300 may be implemented as instructions stored in memory (e.g., firmware stored in a memory coupled with a controller). For example, the instructions, when executed by a controller, may cause the controller to perform the operations of the flowchart 300.

One or more of the operations described in the flowchart 300 may be performed earlier or later, omitted, replaced, supplemented, or combined with another operation. Also, additional operations described herein may replace, supplement or be combined with one or more of the operations described in the flowchart 300.

FIG. 4 shows an example of a data structure that supports learned temperature compensation in accordance with examples as disclosed herein. The data structure 400 depicts an example of a table used to store one or more parameters for different system temperature previously identified by a host system. In some examples, a first row of the table stores one or more parameters for a first temperature, where a first column of the first row may store a recorded system temperature (e.g., 100° F.), a second column of the first row may store a time at which a set of parameters were stored for the recorded system temperature, a third column of the first row stores a CAS latency, and an Nth row stores reference voltages used to decode a tri-level signaling scheme. The data structure 400 may be managed by a parameter storage described herein (e.g., the parameter storage 225 of FIG. 2).

Figure 5:
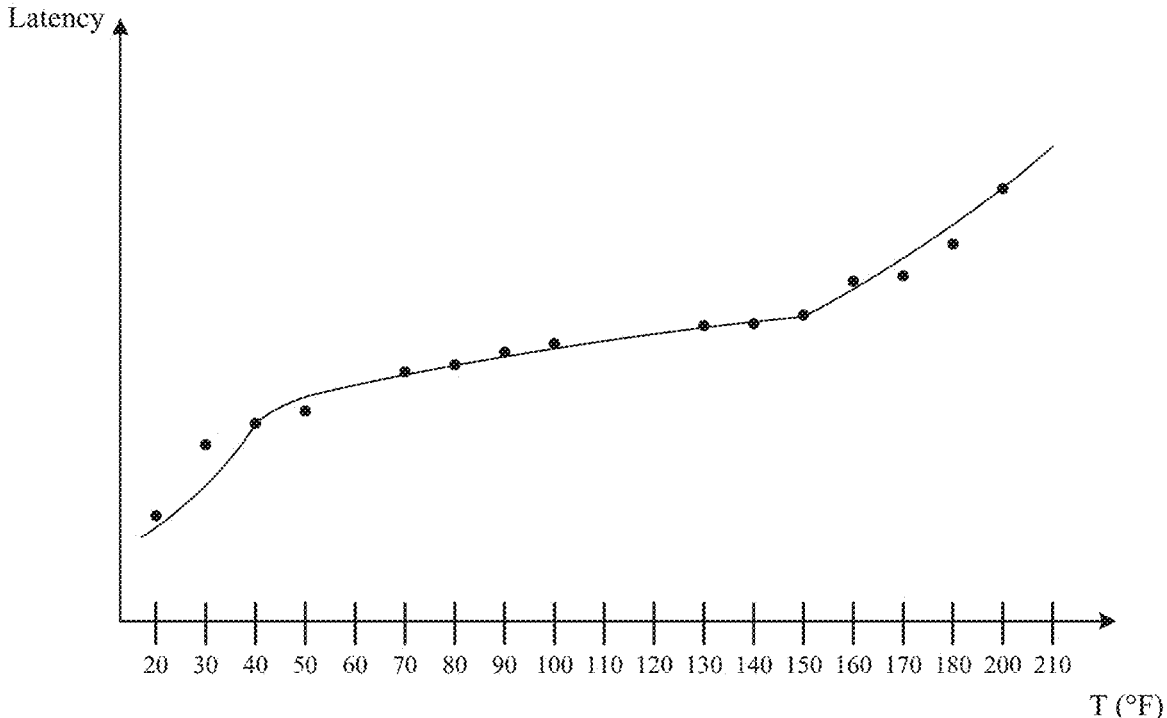
FIG. 5 shows an example of a diagram that supports learned temperature compensation in accordance with examples as disclosed herein.

FIG. 5 shows an example of a diagram that supports learned temperature compensation in accordance with examples as disclosed herein. The diagram 500 depicts a curve that has been fitted to the values of a latency parameter stored in a parameter storage (e.g., the parameter storage 225 of FIG. 2) across a set of system temperatures (e.g., in Fahrenheit). As depicted in FIG. 5, in some examples, values for the latency parameter may not exist for certain of the temperature (e.g., if the system temperature has not yet been experienced/identified, if the system temperature has expired, etc.). In some examples, multiple curves may be determined for multiple parameters determined for multiple system temperatures.

Figure 6:
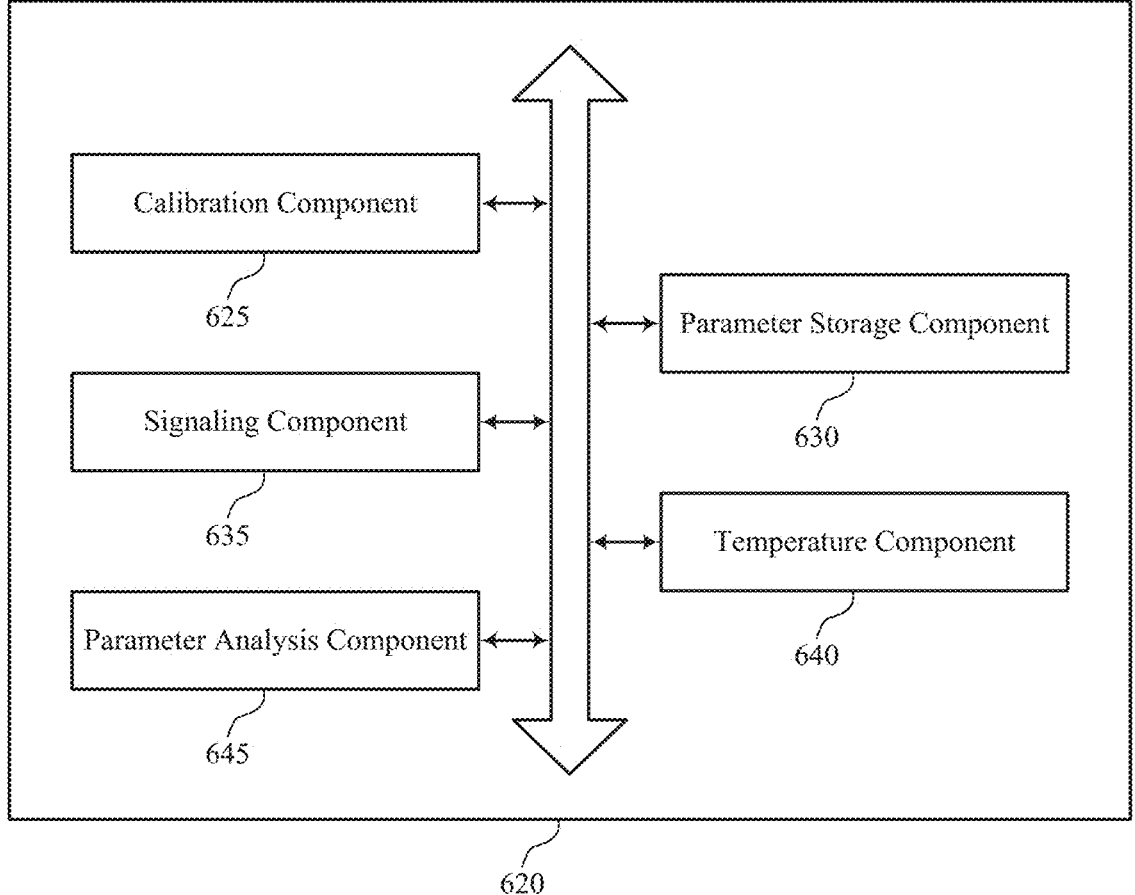
FIG. 6 shows a block diagram of a host system that supports learned temperature compensation in accordance with examples as disclosed herein.

FIG. 6 shows a block diagram 600 of a host system 620 that supports learned temperature compensation in accordance with examples as disclosed herein. The host system 620 may be an example of aspects of a host system as described with reference to FIGS. 1 through 5. The host system 620, or various components thereof, may be an example of means for performing various aspects of learned temperature compensation as described herein. For example, the host system 620 may include a calibration component 625, a parameter storage component 630, a signaling component 635, a temperature component 640, a parameter analysis component 645, or any combination thereof. Each of these components, or components of subcomponents thereof (e.g., one or more processors, one or more memories), may communicate, directly or indirectly, with one another (e.g., via one or more buses).

The calibration component 625 may be configured as or otherwise support a means for determining, by a host system coupled to a memory system via an interface, a first set of parameters associated with operation of the interface based at least in part on a first training operation of the interface. The parameter storage component 630 may be configured as or otherwise support a means for storing, by the host system based at least in part on determining the first set of parameters, an indication of the first set of parameters and a first temperature associated with the first set of parameters. In some examples, the calibration component 625 may be configured as or otherwise support a means for determining, by the host system, a second set of parameters associated with the operation of the interface based at least in part on a second training operation of the interface. In some examples, the parameter storage component 630 may be configured as or otherwise support a means for storing, by the host system based at least in part on determining the second set of parameters, an indication of the second set of parameters and a second temperature associated with the second set of parameters. The signaling component 635 may be configured as or otherwise support a means for configuring, by the host system for a third temperature, a third set of parameters for the operation of the interface based at least in part on the first set of parameters stored for the first temperature, the second set of parameters stored for the second temperature, or both. In some examples, the signaling component 635 may be configured as or otherwise support a means for communicating, by the host system, with the memory system over the interface in accordance with the third set of parameters.

In some examples, the temperature component 640 may be configured as or otherwise support a means for identifying, after storing the indication of the first set of parameters and the indication of the second set of parameters, the third temperature. In some examples, the signaling component 635 may be configured as or otherwise support a means for determining, based at least in part on identifying the third temperature, that the third temperature is between the first temperature and the second temperature. In some examples, the signaling component 635 may be configured as or otherwise support a means for determining, based at least in part on the third temperature being between the first temperature and the second temperature, the third set of parameters based at least in part on an interpolation of the first set of parameters and the second set of parameters.

In some examples, the parameter analysis component 645 may be configured as or otherwise support a means for identifying, based at least in part on identifying the second temperature, a plurality of temperatures associated with a plurality of sets of parameters that are stored at the host system, the plurality of temperatures including the first temperature and the second temperature. In some examples, the parameter analysis component 645 may be configured as or otherwise support a means for performing, for one or more parameters of the plurality of sets of parameters, a curve fitting operation across the plurality of temperatures. In some examples, the signaling component 635 may be configured as or otherwise support a means for determining, based at least in part on the curve fitting operation, the third set of parameters for the third temperature.

In some examples, the signaling component 635 may be configured as or otherwise support a means for retrieving, from storage, the first set of parameters associated with the first temperature based at least in part on the third temperature being within a threshold amount of the first temperature, where configuring the third set of parameters includes configuring the first set of parameters for the operation of the interface.

In some examples, the temperature component 640 may be configured as or otherwise support a means for identifying, after storing the indication of the first set of parameters, the second temperature associated with the second set of parameters. In some examples, the calibration component 625 may be configured as or otherwise support a means for identifying, based at least in part on identifying the second temperature, at least one set of temperatures associated with at least one set of parameters that are stored at the host system, the at least one set of temperatures including the first temperature. In some examples, the calibration component 625 may be configured as or otherwise support a means for determining, based at least in part on identifying the second temperature, that respective differences between the second temperature and temperatures of the at least one set of temperatures exceed a threshold. In some examples, the calibration component 625 may be configured as or otherwise support a means for performing, based at least in part on the respective differences between the second temperature and the temperatures of the at least one set of temperatures exceeding the threshold, the second training operation.

In some examples, storing the indication of the second set of parameters and the second temperature further includes storing a time at which the indication of the second set of parameters and the second temperature are stored; identifying, after storing the indication of the second set of parameters, the second temperature associated with the second set of parameters; determining, based at least in part on a threshold duration having elapsed relative to the time, a fourth set of parameters associated with the operation of the interface based at least in part on a third training operation of the interface; and overwriting, based at least in part on determining the fourth set of parameters, the indication of the second set of parameters with an indication of the fourth set of parameters.

In some examples, the temperature component 640 may be configured as or otherwise support a means for identifying, after storing the indication of the second set of parameters, the second temperature associated with the second set of parameters. In some examples, the signaling component 635 may be configured as or otherwise support a means for communicating, based at least in part on identifying the second temperature, with the memory system over the interface in accordance with the second set of parameters. In some examples, the signaling component 635 may be configured as or otherwise support a means for detecting, based at least in part on communicating with the memory system over the interface in accordance with the second set of parameters, a threshold quantity of errors associated with communicating with the memory system. In some examples, the calibration component 625 may be configured as or otherwise support a means for determining, based at least in part on a detecting the threshold quantity of errors, a fourth set of parameters associated with the operation of the interface based at least in part on a third training operation of the interface. In some examples, the parameter storage component 630 may be configured as or otherwise support a means for overwriting, based at least in part on determining the fourth set of parameters, the indication of the second set of parameters with an indication of the fourth set of parameters.

In some examples, storing the indication of the first set of parameters and the first temperature includes storing the first temperature in a first row and a first column of a table and storing the indication of the first set of parameters in the first row and one or more subsequent columns of the table, and storing the indication of the second set of parameters and the second temperature includes storing the second temperature in a second row and the first column of the table and storing the indication of the first set of parameters in the second row and the one or more subsequent columns of the table.

In some examples, the temperature component 640 may be configured as or otherwise support a means for identifying, after configuring the third set of parameters, a fourth temperature within a threshold the first temperature. In some examples, the parameter storage component 630 may be configured as or otherwise support a means for reading, based at least in on identifying the fourth temperature, the first column of the table across a plurality of rows of the table. In some examples, the parameter storage component 630 may be configured as or otherwise support a means for identifying, based at least in on reading the first column of the table, the first row of the table based at least in part on the first column of the table associated with the first row of the table storing the first temperature. In some examples, the parameter storage component 630 may be configured as or otherwise support a means for accessing, based at least in part on identifying the first row of the table, the first set of parameters stored in the one or more subsequent columns of the table associated with the first row of the table. In some examples, the signaling component 635 may be configured as or otherwise support a means for configuring, based at least in part on accessing the first set of parameters, the first set of parameters for the operation of the interface.

In some examples, the first set of parameters includes a timing of command/address signaling, a timing for reading data from the memory system, a timing for writing data to the memory system, an offset between a data signal and a data clock signal, one or more reference voltages associated with data signaling levels, or any combination thereof.

In some examples, determining the first set of parameters including determining, during the first training operation, one or more timing parameters associated with the interface, one or more voltage parameters associated with the interface, or both, at the first temperature, and determining the second set of parameters including determining, during the second training operation, the one or more timing parameters and the one or more voltage parameters at the second temperature.

In some examples, the temperature component 640 may be configured as or otherwise support a means for reading the first temperature from the memory system, where the first set of parameters are determined based at least in part on reading the first temperature.

In some examples, the first temperature, the second temperature, and the third temperature are each measured at the host system, the memory system, the interface, or a combination thereof.

In some examples, the described functionality of the host system 620, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the host system 620, or various components thereof, may be implemented at least in part by instructions (e.g., stored in memory, non-transitory computer-readable medium) executable by such at least one processor.

FIG. 7 shows a flowchart illustrating a method 700 that supports learned temperature compensation in accordance with examples as disclosed herein. The operations of method 700 may be implemented by a host system or its components as described herein. For example, the operations of method 700 may be performed by a host system as described with reference to FIGS. 1 through 6. In some examples, a host system may execute a set of instructions to control the functional elements of the device to perform the described functions. Additionally, or alternatively, the host system may perform aspects of the described functions using special-purpose hardware.

At 705, the method may include determining, by a host system coupled to a memory system via an interface, a first set of parameters associated with operation of the interface based at least in part on a first training operation of the interface. In some examples, aspects of the operations of 705 may be performed by a calibration component 625 as described with reference to FIG. 6.

At 710, the method may include storing, by the host system based at least in part on determining the first set of parameters, an indication of the first set of parameters and a first temperature associated with the first set of parameters. In some examples, aspects of the operations of 710 may be performed by a parameter storage component 630 as described with reference to FIG. 6.

At 715, the method may include determining, by the host system, a second set of parameters associated with the operation of the interface based at least in part on a second training operation of the interface. In some examples, aspects of the operations of 715 may be performed by a calibration component 625 as described with reference to FIG. 6.

At 720, the method may include storing, by the host system based at least in part on determining the second set of parameters, an indication of the second set of parameters and a second temperature associated with the second set of parameters. In some examples, aspects of the operations of 720 may be performed by a parameter storage component 630 as described with reference to FIG. 6.

At 725, the method may include configuring, by the host system for a third temperature, a third set of parameters for the operation of the interface based at least in part on the first set of parameters stored for the first temperature, the second set of parameters stored for the second temperature, or both. In some examples, aspects of the operations of 725 may be performed by a signaling component 635 as described with reference to FIG. 6.

At 730, the method may include communicating, by the host system, with the memory system over the interface in accordance with the third set of parameters. In some examples, aspects of the operations of 730 may be performed by a signaling component 635 as described with reference to FIG. 6.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for determining, by a host system coupled to a memory system via an interface, a first set of parameters associated with operation of the interface based at least in part on a first training operation of the interface; storing, by the host system based at least in part on determining the first set of parameters, an indication of the first set of parameters and a first temperature associated with the first set of parameters; determining, by the host system, a second set of parameters associated with the operation of the interface based at least in part on a second training operation of the interface; storing, by the host system based at least in part on determining the second set of parameters, an indication of the second set of parameters and a second temperature associated with the second set of parameters; configuring, by the host system for a third temperature, a third set of parameters for the operation of the interface based at least in part on the first set of parameters stored for the first temperature, the second set of parameters stored for the second temperature, or both; and communicating, by the host system, with the memory system over the interface in accordance with the third set of parameters.

Aspect 2: The method, apparatus, or non-transitory computer-readable medium of aspect 1, further including operations, features, circuitry, logic, means, or instructions, or any combination thereof for identifying, after storing the indication of the first set of parameters and the indication of the second set of parameters, the third temperature; determining, based at least in part on identifying the third temperature, that the third temperature is between the first temperature and the second temperature; and determining, based at least in part on the third temperature being between the first temperature and the second temperature, the third set of parameters based at least in part on an interpolation of the first set of parameters and the second set of parameters.

Aspect 3: The method, apparatus, or non-transitory computer-readable medium of any of aspects 1 through 2, further including operations, features, circuitry, logic, means, or instructions, or any combination thereof for identifying, based at least in part on identifying the second temperature, a plurality of temperatures associated with a plurality of sets of parameters that are stored at the host system, the plurality of temperatures including the first temperature and the second temperature; performing, for one or more parameters of the plurality of sets of parameters, a curve fitting operation across the plurality of temperatures; and determining, based at least in part on the curve fitting operation, the third set of parameters for the third temperature.

Aspect 4: The method, apparatus, or non-transitory computer-readable medium of any of aspects 1 through 3, further including operations, features, circuitry, logic, means, or instructions, or any combination thereof for retrieving, from storage, the first set of parameters associated with the first temperature based at least in part on the third temperature being within a threshold amount of the first temperature, where configuring the third set of parameters includes configuring the first set of parameters for the operation of the interface.

Aspect 5: The method, apparatus, or non-transitory computer-readable medium of any of aspects 1 through 4, further including operations, features, circuitry, logic, means, or instructions, or any combination thereof for identifying, after storing the indication of the first set of parameters, the second temperature associated with the second set of parameters; identifying, based at least in part on identifying the second temperature, at least one set of temperatures associated with at least one set of parameters that are stored at the host system, the at least one set of temperatures including the first temperature; determining, based at least in part on identifying the second temperature, that respective differences between the second temperature and temperatures of the at least one set of temperatures exceed a threshold; and performing, based at least in part on the respective differences between the second temperature and the temperatures of the at least one set of temperatures exceeding the threshold, the second training operation.

Aspect 6: The method, apparatus, or non-transitory computer-readable medium of any of aspects 1 through 5, where storing the indication of the second set of parameters and the second temperature further includes storing a time at which the indication of the second set of parameters and the second temperature are stored; identifying, after storing the indication of the second set of parameters, the second temperature associated with the second set of parameters; determining, based at least in part on a threshold duration having elapsed relative to the time, a fourth set of parameters associated with the operation of the interface based at least in part on a third training operation of the interface; and overwriting, based at least in part on determining the fourth set of parameters, the indication of the second set of parameters with an indication of the fourth set of parameters.

Aspect 7: The method, apparatus, or non-transitory computer-readable medium of any of aspects 1 through 6, further including operations, features, circuitry, logic, means, or instructions, or any combination thereof for identifying, after storing the indication of the second set of parameters, the second temperature associated with the second set of parameters; communicating, based at least in part on identifying the second temperature, with the memory system over the interface in accordance with the second set of parameters; detecting, based at least in part on communicating with the memory system over the interface in accordance with the second set of parameters, a threshold quantity of errors associated with communicating with the memory system; determining, based at least in part on a detecting the threshold quantity of errors, a fourth set of parameters associated with the operation of the interface based at least in part on a third training operation of the interface; and overwriting, based at least in part on determining the fourth set of parameters, the indication of the second set of parameters with an indication of the fourth set of parameters.

Aspect 8: The method, apparatus, or non-transitory computer-readable medium of any of aspects 1 through 7, where storing the indication of the first set of parameters and the first temperature includes storing the first temperature in a first row and a first column of a table and storing the indication of the first set of parameters in the first row and one or more subsequent columns of the table, and storing the indication of the second set of parameters and the second temperature includes storing the second temperature in a second row and the first column of the table and storing the indication of the first set of parameters in the second row and the one or more subsequent columns of the table.

Aspect 9: The method, apparatus, or non-transitory computer-readable medium of aspect 8, further including operations, features, circuitry, logic, means, or instructions, or any combination thereof for identifying, after configuring the third set of parameters, a fourth temperature within a threshold the first temperature; reading, based at least in on identifying the fourth temperature, the first column of the table across a plurality of rows of the table; identifying, based at least in on reading the first column of the table, the first row of the table based at least in part on the first column of the table associated with the first row of the table storing the first temperature; accessing, based at least in part on identifying the first row of the table, the first set of parameters stored in the one or more subsequent columns of the table associated with the first row of the table; and configuring, based at least in part on accessing the first set of parameters, the first set of parameters for the operation of the interface.

Aspect 10: The method, apparatus, or non-transitory computer-readable medium of any of aspects 1 through 9, where the first set of parameters includes a timing of command/address signaling, a timing for reading data from the memory system, a timing for writing data to the memory system, an offset between a data signal and a data clock signal, one or more reference voltages associated with data signaling levels, or any combination thereof.

Aspect 11: The method, apparatus, or non-transitory computer-readable medium of any of aspects 1 through 10, where determining the first set of parameters including determining, during the first training operation, one or more timing parameters associated with the interface, one or more voltage parameters associated with the interface, or both, at the first temperature, and determining the second set of parameters including determining, during the second training operation, the one or more timing parameters and the one or more voltage parameters at the second temperature.

Aspect 12: The method, apparatus, or non-transitory computer-readable medium of any of aspects 1 through 11, further including operations, features, circuitry, logic, means, or instructions, or any combination thereof for reading the first temperature from the memory system, where the first set of parameters are determined based at least in part on reading the first temperature.

Aspect 13: The method, apparatus, or non-transitory computer-readable medium of any of aspects 1 through 12, where the first temperature, the second temperature, and the third temperature are each measured at the host system, the memory system, the interface, or a combination thereof.

It should be noted that the aspects described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 14: An apparatus, including: at least one controller configured to cause the apparatus to: determine, by a host system coupled to a memory system via an interface, a first set of parameters associated with operation of the interface based at least in part on a first training operation of the interface; store, by the host system, based at least in part on determining the first set of parameters, an indication of the first set of parameters and a first temperature associated with the first set of parameters; determine, by the host system, a second set of parameters associated with the operation of the interface based at least in part on a second training operation of the interface; store, by the host system, based at least in part on determining the second set of parameters, an indication of the second set of parameters and a second temperature associated with the second set of parameters; configure, by the host system for a third temperature, a third set of parameters for the operation of the interface based at least in part on the first set of parameters stored for the first temperature, the second set of parameters stored for the second temperature, or both; and communicate, by the host system, with the memory system over the interface in accordance with the third set of parameters.

Aspect 15: The apparatus of aspect 14, where the at least one controller is further configured to cause the apparatus to: identify, after storing the indication of the first set of parameters and the indication of the second set of parameters, the third temperature; determine, based at least in part on identifying the third temperature, that the third temperature is between the first temperature and the second temperature; and determine, based at least in part on the third temperature being between the first temperature and the second temperature, the third set of parameters based at least in part on an interpolation of the first set of parameters and the second set of parameters.

Aspect 16: The apparatus of any of aspects 14 through 15, where the at least one controller is further configured to cause the apparatus to: identify, based at least in part on identifying the second temperature, a plurality of temperatures associated with a plurality of sets of parameters that are stored at the host system, the plurality of temperatures including the first temperature and the second temperature; perform, for one or more parameters of the plurality of sets of parameters, a curve fitting operation across the plurality of temperatures; and determine, based at least in part on the curve fitting operation, the third set of parameters for the third temperature.

Aspect 17: The apparatus of any of aspects 14 through 16, where the third temperature is within a threshold amount of the first temperature, and where the at least one controller is further configured to cause the apparatus to: retrieve, from storage, the first set of parameters associated with the first temperature based at least in part on the third temperature being within a threshold amount of the first temperature, where configuring the third set of parameters includes configuring the first set of parameters for the operation of the interface.

Aspect 18: The apparatus of any of aspects 14 through 17, where the at least one controller is further configured to cause the apparatus to: identify, after storing the indication of the first set of parameters, the second temperature associated with the second set of parameters; identify, based at least in part on identifying the second temperature, at least one set of temperatures associated with at least one set of parameters that are stored at the host system, the at least one set of temperatures including the first temperature; determine, based at least in part on identifying the second temperature, that respective differences between the second temperature and temperatures of the at least one set of temperatures exceed a threshold; and perform, based at least in part on the respective differences between the second temperature and the temperatures of the at least one set of temperatures exceeding the threshold, the second training operation.

Aspect 19: The apparatus of any of aspects 14 through 18, where, to store the indication of the second set of parameters and the second temperature, the at least one controller is further configured to cause the apparatus to: store a time at which the indication of the second set of parameters and the second temperature are stored; identify, after storing the indication of the second set of parameters, the second temperature associated with the second set of parameters; determine, based at least in part on a threshold duration having elapsed relative to the time, a fourth set of parameters associated with the operation of the interface based at least in part on a third training operation of the interface; and overwrite, based at least in part on determining the fourth set of parameters, the indication of the second set of parameters with an indication of the fourth set of parameters.

Aspect 20: The apparatus of any of aspects 14 through 19, where the at least one controller is further configured to cause the apparatus to: identify, after storing the indication of the second set of parameters, the second temperature associated with the second set of parameters; communicate, based at least in part on identifying the second temperature, with the memory system over the interface in accordance with the second set of parameters; detect, based at least in part on communicating with the memory system over the interface in accordance with the second set of parameters, a threshold quantity of errors associated with communicating with the memory system; determine, based at least in part on a detecting the threshold quantity of errors, a fourth set of parameters associated with the operation of the interface based at least in part on a third training operation of the interface; and overwrite, based at least in part on determining the fourth set of parameters, the indication of the second set of parameters with an indication of the fourth set of parameters.

An apparatus is described. The following provides an overview of aspects of the apparatus as described herein:

Aspect 21: A non-transitory, computer-readable medium storing instructions executable by at least one processor of an electronic device to cause the electronic device to: determine, by a host system coupled to a memory system via an interface, a first set of parameters associated with operation of the interface based at least in part on a first training operation of the interface; store, by the host system, based at least in part on determining the first set of parameters, an indication of the first set of parameters and a first temperature associated with the first set of parameters; determine, by the host system, a second set of parameters associated with the operation of the interface based at least in part on a second training operation of the interface; store, by the host system, based at least in part on determining the second set of parameters, an indication of the second set of parameters and a second temperature associated with the second set of parameters; configure, by the host system for a third temperature, a third set of parameters for the operation of the interface based at least in part on the first set of parameters stored for the first temperature, the second set of parameters stored for the second temperature, or both; and communicate, by the host system, with the memory system over the interface in accordance with the third set of parameters.

Aspect 22: The non-transitory, computer-readable medium of aspect 21, where the instructions are further executable by the at least one processor to cause the electronic device to: identify, after storing the indication of the first set of parameters and the indication of the second set of parameters, the third temperature; determine, based at least in part on identifying the third temperature, that the third temperature is between the first temperature and the second temperature; and determine, based at least in part on the third temperature being between the first temperature and the second temperature, the third set of parameters based at least in part on an interpolation of the first set of parameters and the second set of parameters.

Aspect 23: The non-transitory, computer-readable medium of any of aspects 21 through 22, where the instructions are further executable by the at least one processor to cause the electronic device to: identify, based at least in part on identifying the second temperature, a plurality of temperatures associated with a plurality of sets of parameters that are stored at the host system, the plurality of temperatures including the first temperature and the second temperature; perform, for one or more parameters of the plurality of sets of parameters, a curve fitting operation across the plurality of temperatures; and determine, based at least in part on the curve fitting operation, the third set of parameters for the third temperature.

Aspect 24: The non-transitory, computer-readable medium of any of aspects 21 through 23, where the third temperature is within a threshold amount of the first temperature, and where the instructions are further executable by the at least one processor to cause the electronic device to: retrieve, from storage, the first set of parameters associated with the first temperature based at least in part on the third temperature being within the threshold amount of the first temperature, where configuring the third set of parameters includes configuring the first set of parameters for the operation of the interface.

Aspect 25: The non-transitory, computer-readable medium of any of aspects 21 through 24, where the instructions are further executable by the at least one processor to cause the electronic device to: identify, after storing the indication of the first set of parameters, the second temperature associated with the second set of parameters; identify, based at least in part on identifying the second temperature, at least one set of temperatures associated with at least one set of parameters that are stored at the host system, the at least one set of temperatures including the first temperature; determine, based at least in part on identifying the second temperature, that respective differences between the second temperature and temperatures of the at least one set of temperatures exceed a threshold; and perform, based at least in part on the respective differences between the second temperature and the temperatures of the at least one set of temperatures exceeding the threshold, the second training operation.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. A conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or may be an indirect conductive path that includes intermediate components, such as switches, transistors, or other components. In some examples, the flow of signals between the connected components may be interrupted for a time, for example, using one or more intermediate components such as switches or transistors.

A switching component (e.g., a transistor) discussed herein may be a field-effect transistor (FET), and may include a source (e.g., a source terminal), a drain (e.g., a drain terminal), a channel between the source and drain, and a gate (e.g., a gate terminal). A conductivity of the channel may be controlled (e.g., modulated) by applying a voltage to the gate which, in some examples, may result in the channel becoming conductive. A switching component may be an example of an n-type FET or a p-type FET.

The description set forth herein, in connection with the appended drawings, describes example configurations and does not represent all the examples that may be implemented or that are within the scope of the claims. The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Similar components may be distinguished by following the reference label by one or more dashes and additional labeling that distinguishes among the similar components. If just the first reference label is used in the specification, the description is applicable to any one of the similar components having the same first reference label irrespective of the additional reference labels.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Due to the nature of software, functions described herein can be implemented using software executed by a processor, hardware, firmware, hardwiring, or combinations of any of these. Features implementing functions may be physically located at various positions, including being distributed such that portions of functions are implemented at different physical locations.

Illustrative blocks and modules described herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processor. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium, or combination of multiple media, that can be accessed by a computer. By way of example, and not limitation, non-transitory computer-readable media can comprise RAM, ROM, electrically erasable programmable read-only memory (EEPROM), optical disk storage, magnetic disk storage or other magnetic storage devices, or any other non-transitory medium or combination of media that can be used to carry or store desired program code means in the form of instructions or data structures and that can be accessed by a computer, or a processor.

The descriptions and drawings are provided to enable a person having ordinary skill in the art to make or use the disclosure. Various modifications to the disclosure will be apparent to the person having ordinary skill in the art, and the techniques disclosed herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
determining, by a host system coupled to a memory system via an interface, a first set of parameters associated with operation of the interface based at least in part on a first training operation of the interface;
storing, by the host system based at least in part on determining the first set of parameters, an indication of the first set of parameters and a first temperature associated with the first set of parameters;
determining, by the host system, a second set of parameters associated with the operation of the interface based at least in part on a second training operation of the interface;
storing, by the host system based at least in part on determining the second set of parameters, an indication of the second set of parameters and a second temperature associated with the second set of parameters;
configuring, by the host system for a third temperature, a third set of parameters for the operation of the interface based at least in part on the first set of parameters stored for the first temperature, the second set of parameters stored for the second temperature, or both; and
communicating, by the host system, with the memory system over the interface in accordance with the third set of parameters.

2. The method of claim 1, further comprising:
identifying, after storing the indication of the first set of parameters and the indication of the second set of parameters, the third temperature;
determining, based at least in part on identifying the third temperature, that the third temperature is between the first temperature and the second temperature; and
determining, based at least in part on the third temperature being between the first temperature and the second temperature, the third set of parameters based at least in part on an interpolation of the first set of parameters and the second set of parameters.

3. The method of claim 1, further comprising:
identifying, based at least in part on identifying the second temperature, a plurality of temperatures associated with a plurality of sets of parameters that are stored at the host system, the plurality of temperatures comprising the first temperature and the second temperature;
performing, for one or more parameters of the plurality of sets of parameters, a curve fitting operation across the plurality of temperatures; and
determining, based at least in part on the curve fitting operation, the third set of parameters for the third temperature.

4. The method of claim 1, wherein the third temperature is within a threshold amount of the first temperature, the method further comprising:
retrieving, from storage, the first set of parameters associated with the first temperature based at least in part on the third temperature being within the threshold amount of the first temperature, wherein configuring the third set of parameters comprises configuring the first set of parameters for the operation of the interface.

5. The method of claim 1, further comprising:
identifying, after storing the indication of the first set of parameters, the second temperature associated with the second set of parameters;
identifying, based at least in part on identifying the second temperature, at least one set of temperatures associated with at least one set of parameters that are stored at the host system, the at least one set of temperatures comprising the first temperature;
determining, based at least in part on identifying the second temperature, that respective differences between the second temperature and temperatures of the at least one set of temperatures exceed a threshold; and
performing, based at least in part on the respective differences between the second temperature and the temperatures of the at least one set of temperatures exceeding the threshold, the second training operation.

6. The method of claim 1, wherein storing the indication of the second set of parameters and the second temperature further comprises:
storing a time at which the indication of the second set of parameters and the second temperature are stored;
identifying, after storing the indication of the second set of parameters, the second temperature associated with the second set of parameters;
determining, based at least in part on a threshold duration having elapsed relative to the time, a fourth set of parameters associated with the operation of the interface based at least in part on a third training operation of the interface; and overwriting, based at least in part on determining the fourth set of parameters, the indication of the second set of parameters with an indication of the fourth set of parameters.

7. The method of claim 1, further comprising:

identifying, after storing the indication of the second set of parameters, the second temperature associated with the second set of parameters;

communicating, based at least in part on identifying the second temperature, with the memory system over the interface in accordance with the second set of parameters;

detecting, based at least in part on communicating with the memory system over the interface in accordance with the second set of parameters, a threshold quantity of errors associated with communicating with the memory system;

determining, based at least in part on a detecting the threshold quantity of errors, a fourth set of parameters associated with the operation of the interface based at least in part on a third training operation of the interface; and overwriting, based at least in part on determining the fourth set of parameters, the indication of the second set of parameters with an indication of the fourth set of parameters.

8. The method of claim 1, wherein:

storing the indication of the first set of parameters and the first temperature comprises storing the first temperature in a first row and a first column of a table and storing the indication of the first set of parameters in the first row and one or more subsequent columns of the table, and storing the indication of the second set of parameters and the second temperature comprises storing the second temperature in a second row and the first column of the table and storing the indication of the first set of parameters in the second row and the one or more subsequent columns of the table.

9. The method of claim 8, further comprising:

identifying, after configuring the third set of parameters, a fourth temperature within a threshold the first temperature;

reading, based at least in on identifying the fourth temperature, the first column of the table across a plurality of rows of the table;

identifying, based at least in on reading the first column of the table, the first row of the table based at least in part on the first column of the table associated with the first row of the table storing the first temperature;

accessing, based at least in part on identifying the first row of the table, the first set of parameters stored in the one or more subsequent columns of the table associated with the first row of the table; and configuring, based at least in part on accessing the first set of parameters, the first set of parameters for the operation of the interface.

10. The method of claim 1, wherein the first set of parameters comprises a timing of command/address signaling, a timing for reading data from the memory system, a timing for writing data to the memory system, an offset between a data signal and a data clock signal, one or more reference voltages associated with data signaling levels, or any combination thereof.

11. The method of claim 1, wherein:

determining the first set of parameters comprising determining, during the first training operation, one or more timing parameters associated with the interface, one or more voltage parameters associated with the interface, or both, at the first temperature, and determining the second set of parameters comprising determining, during the second training operation, the one or more timing parameters and the one or more voltage parameters at the second temperature.

12. The method of claim 1, further comprising:

reading the first temperature from the memory system, wherein the first set of parameters are determined based at least in part on reading the first temperature.

13. The method of claim 1, wherein the first temperature, the second temperature, and the third temperature are each measured at the host system, the memory system, the interface, or a combination thereof.

14. An apparatus, comprising:

at least one controller configured to cause the apparatus to:

determine, by a host system coupled to a memory system via an interface, a first set of parameters associated with operation of the interface based at least in part on a first training operation of the interface;

store, by the host system, based at least in part on determining the first set of parameters, an indication of the first set of parameters and a first temperature associated with the first set of parameters;

determine, by the host system, a second set of parameters associated with the operation of the interface based at least in part on a second training operation of the interface;

store, by the host system, based at least in part on determining the second set of parameters, an indication of the second set of parameters and a second temperature associated with the second set of parameters;

configure, by the host system for a third temperature, a third set of parameters for the operation of the interface based at least in part on the first set of parameters stored for the first temperature, the second set of parameters stored for the second temperature, or both; and communicate, by the host system, with the memory system over the interface in accordance with the third set of parameters.

15. The apparatus of claim 14, wherein the at least one controller is further configured to cause the apparatus to:

identify, after storing the indication of the first set of parameters and the indication of the second set of parameters, the third temperature;

determine, based at least in part on identifying the third temperature, that the third temperature is between the first temperature and the second temperature; and determine, based at least in part on the third temperature being between the first temperature and the second temperature, the third set of parameters based at least in part on an interpolation of the first set of parameters and the second set of parameters.

16. The apparatus of claim 14, wherein the at least one controller is further configured to cause the apparatus to:

identify, based at least in part on identifying the second temperature, a plurality of temperatures associated with a plurality of sets of parameters that are stored at the host system, the plurality of temperatures comprising the first temperature and the second temperature;

perform, for one or more parameters of the plurality of
sets of parameters, a curve fitting operation across the
plurality of temperatures; and determine, based at least in part on the curve fitting
operation, the third set of parameters for the third
temperature.

17. The apparatus of claim 14, wherein the third tempera-
ture is within a threshold amount of the first temperature,
and wherein the at least one controller is further configured
to cause the apparatus to:

retrieve, from storage, the first set of parameters associ-
ated with the first temperature based at least in part on
the third temperature being within the threshold amount
of the first temperature, wherein configuring the third
set of parameters comprises configuring the first set of
parameters for the operation of the interface.

18. The apparatus of claim 14, wherein the at least one
controller is further configured to cause the apparatus to:

identify, after storing the indication of the first set of
parameters, the second temperature associated with the
second set of parameters;

identify, based at least in part on identifying the second
temperature, at least one set of temperatures associated
with at least one set of parameters that are stored at the
host system, the at least one set of temperatures com-
prising the first temperature;

determine, based at least in part on identifying the second
temperature, that respective differences between the
second temperature and temperatures of the at least one
set of temperatures exceed a threshold; and perform, based at least in part on the respective differ-
ences between the second temperature and the tem-
peratures of the at least one set of temperatures exceed-
ing the threshold, the second training operation.

19. The apparatus of claim 14, wherein, to store the
indication of the second set of parameters and the second
temperature, the at least one controller is further configured
to cause the apparatus to:

store a time at which the indication of the second set of
parameters and the second temperature are stored;

identify, after storing the indication of the second set of
parameters, the second temperature associated with the
second set of parameters;

determine, based at least in part on a threshold duration
having elapsed relative to the time, a fourth set of
parameters associated with the operation of the inter-
face based at least in part on a third training operation
of the interface; and overwrite, based at least in part on determining the fourth
set of parameters, the indication of the second set of
parameters with an indication of the fourth set of
parameters.

20. The apparatus of claim 14, wherein the at least one
controller is further configured to cause the apparatus to:

identify, after storing the indication of the second set of
parameters, the second temperature associated with the
second set of parameters;

communicate, based at least in part on identifying the
second temperature, with the memory system over the
interface in accordance with the second set of param-
eters;

detect, based at least in part on communicating with the
memory system over the interface in accordance with
the second set of parameters, a threshold quantity of
errors associated with communicating with the memory
system;

determine, based at least in part on a detecting the
threshold quantity of errors, a fourth set of parameters
associated with the operation of the interface based at
least in part on a third training operation of the inter-
face; and overwrite, based at least in part on determining the fourth
set of parameters, the indication of the second set of
parameters with an indication of the fourth set of
parameters.

21. A non-transitory, computer-readable medium storing
instructions executable by at least one processor of an
electronic device to cause the electronic device to:

determine, by a host system coupled to a memory system
via an interface, a first set of parameters associated with
operation of the interface based at least in part on a first
training operation of the interface;

store, by the host system, based at least in part on
determining the first set of parameters, an indication of
the first set of parameters and a first temperature
associated with the first set of parameters;

determine, by the host system, a second set of parameters
associated with the operation of the interface based at
least in part on a second training operation of the
interface;

store, by the host system, based at least in part on
determining the second set of parameters, an indication
of the second set of parameters and a second tempera-
ture associated with the second set of parameters;

configure, by the host system for a third temperature, a
third set of parameters for the operation of the interface
based at least in part on the first set of parameters stored
for the first temperature, the second set of parameters
stored for the second temperature, or both; and communicate, by the host system, with the memory
system over the interface in accordance with the third
set of parameters.

22. The non-transitory, computer-readable medium of
claim 21, wherein the instructions are further executable by
the at least one processor to cause the electronic device to:

identify, after storing the indication of the first set of
parameters and the indication of the second set of
parameters, the third temperature;

determine, based at least in part on identifying the third
temperature, that the third temperature is between the
first temperature and the second temperature; and determine, based at least in part on the third temperature
being between the first temperature and the second
temperature, the third set of parameters based at least in
part on an interpolation of the first set of parameters and
the second set of parameters.

23. The non-transitory, computer-readable medium of
claim 21, wherein the instructions are further executable by
the at least one processor to cause the electronic device to:

identify, based at least in part on identifying the second
temperature, a plurality of temperatures associated with
a plurality of sets of parameters that are stored at the
host system, the plurality of temperatures comprising
the first temperature and the second temperature;

perform, for one or more parameters of the plurality of
sets of parameters, a curve fitting operation across the
plurality of temperatures; and determine, based at least in part on the curve fitting
operation, the third set of parameters for the third
temperature.

24. The non-transitory, computer-readable medium of
claim 21, wherein the third temperature is within a threshold amount of the first temperature, and wherein the instructions are further executable by the at least one processor to cause the electronic device to:

retrieve, from storage, the first set of parameters associated with the first temperature based at least in part on the third temperature being within the threshold amount of the first temperature, wherein configuring the third set of parameters comprises configuring the first set of parameters for the operation of the interface.

25. The non-transitory, computer-readable medium of claim 21, wherein the instructions are further executable by the at least one processor to cause the electronic device to:

identify, after storing the indication of the first set of parameters, the second temperature associated with the second set of parameters;

identify, based at least in part on identifying the second temperature, at least one set of temperatures associated with at least one set of parameters that are stored at the host system, the at least one set of temperatures comprising the first temperature;

determine, based at least in part on identifying the second temperature, that respective differences between the second temperature and temperatures of the at least one set of temperatures exceed a threshold; and perform, based at least in part on the respective differences between the second temperature and the temperatures of the at least one set of temperatures exceeding the threshold, the second training operation.

* * * * *